(12) United States Patent
Hebrink et al.

(10) Patent No.: US 11,254,104 B2
(45) Date of Patent: Feb. 22, 2022

(54) MULTILAYER FLUOROPOLYMER FILMS

(71) Applicant: 3M INNOVATIVE PROPERTIES COMPANY, St. Paul, MN (US)

(72) Inventors: Timothy J. Hebrink, Scandia, MN (US); Joseph A. Richie, Stillwater, MN (US); Jacob D. Young, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 183 days.

(21) Appl. No.: 16/086,138

(22) PCT Filed: Mar. 27, 2017

(86) PCT No.: PCT/US2017/024225
§ 371 (c)(1),
(2) Date: Sep. 18, 2018

(87) PCT Pub. No.: WO2017/172564
PCT Pub. Date: Oct. 5, 2017

(65) Prior Publication Data
US 2019/0111666 A1    Apr. 18, 2019

Related U.S. Application Data

(60) Provisional application No. 62/316,965, filed on Apr. 1, 2016.

(51) Int. Cl.
*B32B 27/08*      (2006.01)
*B32B 27/18*      (2006.01)
(Continued)

(52) U.S. Cl.
CPC .............. *B32B 27/08* (2013.01); *B32B 3/30* (2013.01); *B32B 7/02* (2013.01); *B32B 27/18* (2013.01);
(Continued)

(58) Field of Classification Search
CPC .. B32B 27/08; B32B 3/30; B32B 7/02; B32B 27/18; B32B 27/20; B32B 27/285;
(Continued)

(56) References Cited

U.S. PATENT DOCUMENTS 5,103,337 A * 4/1992 Schrenk .................. G02B 5/305
                                                                   359/359
5,132,164 A * 7/1992 Moriya .................... B32B 27/30
                                                                    428/199
(Continued)

FOREIGN PATENT DOCUMENTS

CN        101932445        12/2010
CN        102326103         1/2012
(Continued)

OTHER PUBLICATIONS

Arcella, V. and Ferro R. in Modern Fluoroplastics, by Scheirs., J., ed. John Wiley and Sons, NY, 1997 (Year: 1997).*
(Continued)

*Primary Examiner* — Travis M Figg
(74) *Attorney, Agent, or Firm* — Julie Lapos-Kuchar; James Baker (57) ABSTRACT

A multilayer fluoropolymer film comprising, in order: a first layer comprising a first polymer, the first polymer comprising at least 35 mol percent tetrafluoroethylene comonomer, at least 15 mole percent vinylidene fluoride comonomer, and at least 5 mol percent hexafluoropropylene comonomer, based on the total mol percent of the first polymer; a second layer comprising a second polymer, the second polymer comprising at least 50 mol percent vinylidene fluoride comonomer, based on the total mol percent of the second polymer; and a third layer comprising a third polymer, the third polymer comprising at least 50 mol percent methylmethacrylate comonomer, based on the total mol percent of the third polymer. The multilayer fluoroplymer films are
(Continued)

useful for example, in multi-layer film applications (e.g., traffic sign protection, commercial graphic protection, paint protection, windows, windshields, building exteriors, and photo voltaics).

24 Claims, 5 Drawing Sheets (51) Int. Cl.
```
B32B 27/30      (2006.01)
B32B 27/32      (2006.01)
B32B 27/36      (2006.01)
B32B 27/40      (2006.01)
B32B 7/02       (2019.01)
B32B 3/30       (2006.01)
B32B 27/20      (2006.01)
B32B 27/28      (2006.01)
```
(52) U.S. Cl.
CPC ............ *B32B 27/20* (2013.01); *B32B 27/285* (2013.01); *B32B 27/30* (2013.01); *B32B 27/304* (2013.01); *B32B 27/308* (2013.01); *B32B 27/32* (2013.01); *B32B 27/322* (2013.01); *B32B 27/36* (2013.01); *B32B 27/365* (2013.01); *B32B 27/40* (2013.01); *B32B 2250/03* (2013.01); *B32B 2250/04* (2013.01); *B32B 2250/05* (2013.01); *B32B 2250/24* (2013.01); *B32B 2250/246* (2013.01); *B32B 2264/102* (2013.01); *B32B 2307/406* (2013.01); *B32B 2307/412* (2013.01); *B32B 2307/418* (2013.01); *B32B 2307/71* (2013.01); *B32B 2307/714* (2013.01); *B32B 2307/732* (2013.01); *B32B 2307/748* (2013.01); *B32B 2307/756* (2013.01); *B32B 2405/00* (2013.01); *B32B 2419/00* (2013.01); *B32B 2457/12* (2013.01); *B32B 2551/00* (2013.01); *B32B 2571/00* (2013.01); *B32B 2590/00* (2013.01); *B32B 2605/006* (2013.01)

(58) Field of Classification Search
CPC ..... B32B 27/30; B32B 27/304; B32B 27/308; B32B 27/32; B32B 27/322; B32B 27/36; B32B 27/365; B32B 27/40; B32B 2250/03; B32B 2250/04; B32B 2250/05; B32B 2250/24; B32B 2250/246; B32B 2264/102; B32B 2307/406; B32B 2307/412; B32B 2307/418; B32B 2307/71; B32B 2307/714; B32B 2307/732; B32B 2307/748; B32B 2307/756; B32B 2405/00; B32B 2419/00; B32B 2457/12; B32B 2551/00; B32B 2571/00; B32B 2590/00; B32B 2605/006
See application file for complete search history.

(56) References Cited

U.S. PATENT DOCUMENTS

| | | | | |
|---|---|---|---|---|
| 5,233,465 A * | 8/1993 | Wheatley | ............... | G02B 5/282 359/359 |
| 5,658,670 A * | 8/1997 | Fukushi | ................. | B32B 27/08 156/243 |
| 6,156,400 A * | 12/2000 | Jing | ........................ | B32B 27/08 428/195.1 |
| 6,686,012 B1 * | 2/2004 | Molnar | ................... | F16L 11/04 428/36.91 |
| 6,783,349 B2 * | 8/2004 | Neavin | ................... | B29C 48/08 425/133.5 |
| 8,632,856 B2 * | 1/2014 | Jing | ...................... | B05D 3/0254 427/375 |
| 2002/0025444 A1 * | 2/2002 | Hebrink | ................. | G02B 5/305 428/480 |
| 2006/0280922 A1 * | 12/2006 | Hull | ........................ | B32B 27/08 428/213 |
| 2010/0326517 A1 * | 12/2010 | O'Brien | ................ | F24S 80/525 136/256 |
| 2011/0255155 A1 * | 10/2011 | Hebrink | ................ | B32B 27/322 359/359 |
| 2011/0262754 A1 * | 10/2011 | Zehentmaier | ........... | B32B 27/12 428/421 |
| 2013/0125978 A1 * | 5/2013 | Hull | ..................... | H01L 31/0203 136/256 |
| 2013/0133830 A1 * | 5/2013 | Hull | ..................... | H01L 31/0203 156/309.3 |
| 2014/0083482 A1 * | 3/2014 | Hebrink | ................ | H01L 31/054 136/246 |
| 2015/0010743 A1 * | 1/2015 | Katare | .................. | B29C 48/022 428/215 |
| 2015/0177432 A1 * | 6/2015 | Hebrink | ................ | G02B 5/208 359/359 |
| 2016/0068703 A1 * | 3/2016 | Schmidt | ............... | C09D 139/00 428/520 |

FOREIGN PATENT DOCUMENTS

| | | |
|---|---|---|
| CN | 105196778 | 12/2015 |
| EP | 0469732 | 2/1992 |
| JP | 2002-539293 | 11/2002 |
| JP | 2011-016361 | 1/2011 |
| JP | 2011-507734 | 3/2011 |
| WO | WO 1995/016754 | 6/1995 |
| WO | WO 2000-055130 | 9/2000 |
| WO | WO 2007/087281 | 8/2007 |
| WO | WO 2009-085683 | 7/2009 |
| WO | WO 2010-078046 | 7/2010 |
| WO | WO 2010/078046 | 7/2010 |
| WO | WO 2011/062836 | 5/2011 |
| WO | WO 2011/071847 | 6/2011 |
| WO | WO 2012/154793 | 11/2012 |
| WO | WO 2014/100551 | 6/2014 |
| WO | WO 2014/100580 | 6/2014 |
| WO | WO 2015/195334 | 12/2015 |
| WO | WO 2015/200655 | 12/2015 |
| WO | WO 2015/200657 | 12/2015 |
| WO | WO 2015/200669 | 12/2015 |
| WO | WO 2016/210140 | 12/2016 |

OTHER PUBLICATIONS

Dyneon Fluoroplastics Product Comparison Guide (Year: 2020).*
Lide et al. (CRC Handbook of Chemistry and Physics (101st ed.), 2019, CRC Press).*
International Search Report for PCT International Application No. PCT/US2017/024225, dated Nov. 15, 2017, 7 pages.

* cited by examiner

MULTILAYER FLUOROPOLYMER FILMS

CROSS REFERENCE TO RELATED APPLICATIONS

This application is a national stage filing under 35 U.S.C. 371 of PCT/US2017/024225, filed Mar. 27, 2017, which claims the benefit of U.S. Provisional Application No. 62/316,965, filed Apr. 1, 2016, the disclosure of which is incorporated by reference in its/their entirety herein.

BACKGROUND

Fluoropolymer films are inherently ultraviolet (UV) stable. Such films also tend to have good chemical, stain, and graffiti resistance. Fluoropolymer films, however, do not provide UV protection and tend to be difficult to adhere to other substrates.

Films are often used to protect the surfaces of articles such as retro-reflective traffic signs, commercial graphics, automotive paint, and flexible photovoltaics. It is typically desirable for the film to provide retro-reflective traffic signs with UV protection and graffiti resistance. It is typically desirable for the film to provide commercial graphics with UV protection, stain resistance, and graffiti resistance. It is typically desirable for the film to provide automotive paint with UV protection, and resistance to fouling from insect stains, tree sap, and road grime. It is typically desirable for the film to provide flexible photovoltaics with UV protection, fouling resistance, and low surface reflection, as well as adhere well to photovoltaic encapsulants.

There is still a need for protective overlay films which simultaneously provide one or more of the desired attributes noted above, and preferably with each attribute for a particular application.

SUMMARY

In one aspect, the present disclosure describes a multilayer fluoropolymer film comprising, in order:
  a first layer comprising a first polymer, the first polymer comprising at least 35 (in some embodiments, at least 40, 45, 50, 55, 60, 65, 70, 75, or even up to 80; in some embodiments, in a range from 35 to 80, or even 35 to 75) mol percent tetrafluoroethylene comonomer, at least 15 (in some embodiments, at least 20, 25, 30, 35, 40, 45, or even up to 50; in some embodiments, in a range from 15 to 50, 15 to 40, or even 15 to 35) mole percent vinylidene fluoride comonomer, and at least 5 (in some embodiments, at least 10, 15, or even at least 20; in some embodiments, in a range from 5 to 20, or even 7 to 15) mol percent hexafluoropropylene comonomer, based on the total mol percent of the first polymer;
  a second layer comprising a second polymer, the second polymer comprising at least 50 (in some embodiments, 55, 60, 65, 70, 75, 80, 85, 90, 95, or even 100; in some embodiments, in a range from 50 to 100, 75 to 100, or even 85 to 100) mol percent vinylidene fluoride comonomer, based on the total mol percent of the second polymer; and
  a third layer comprising a third polymer, the third polymer comprising at least 50 (in some embodiments, 55, 60, 65, 70, 75, 80, 85, 90, 95, or even 100; in some embodiments, in a range from 50 to 100, 75 to 100, or even 85 to 100) mol percent methylmethacrylate comonomer, based on the total mol percent of the third polymer. Optionally, the third layer comprises a polyurethane.

Advantages of embodiments of multilayer fluoropolymer films described herein include desirable resistance to staining, to UV damage, and/or to solvent damage. Some embodiments of multilayer fluoropolymer films described herein are useful, for example in multilayer film applications (e.g., retro-reflective traffic signs, commercial graphics, automotive paint, windows, windshields, building exteriors, and photovoltaics).

DETAILED DESCRIPTION

Figure 1:
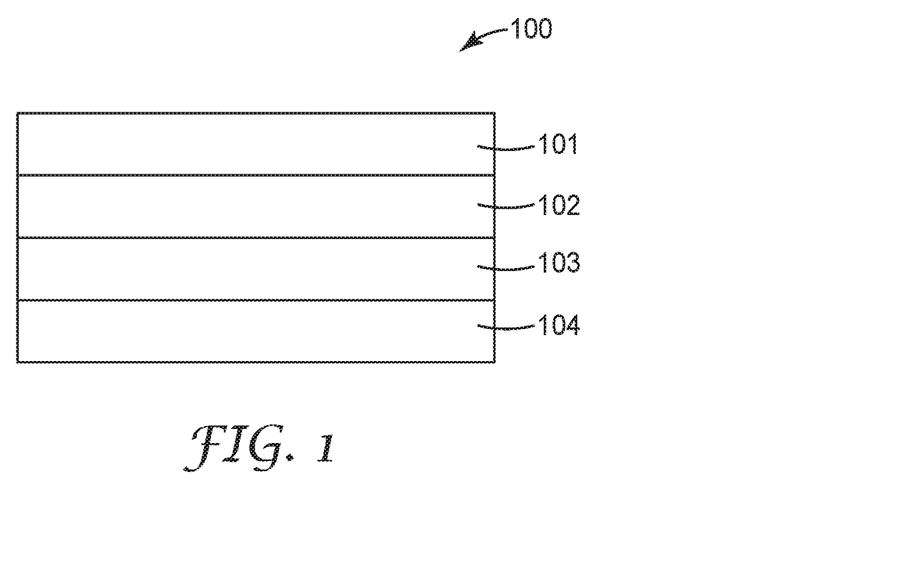
FIG. 1 is a schematic of an exemplary multilayer fluoropolymer film described herein.
Figure 2:
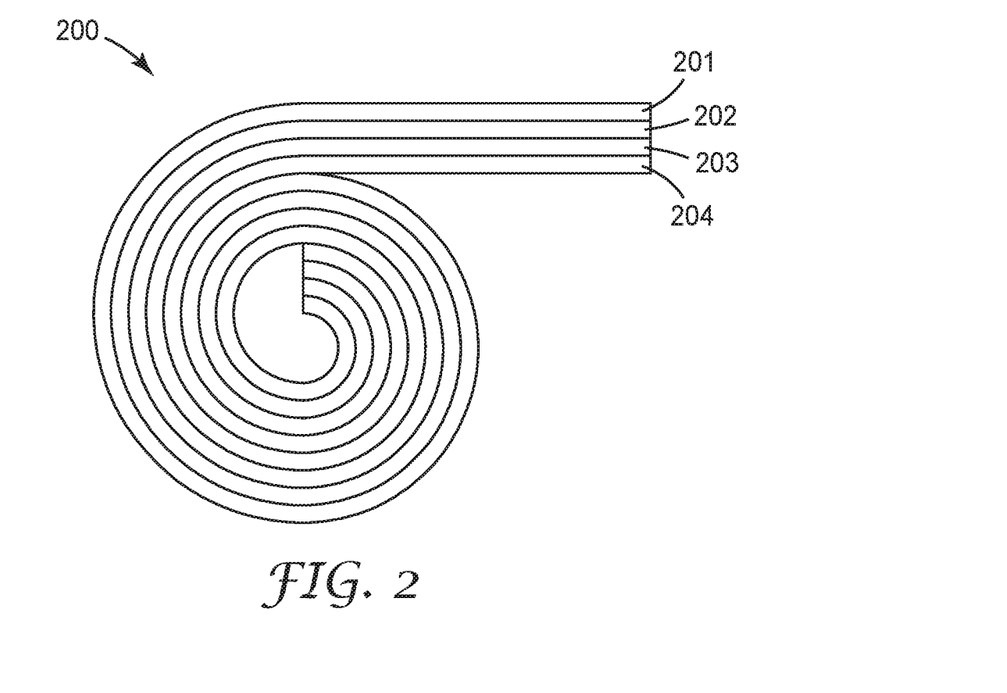
FIG. 2 is the exemplary multilayer fluoropolymer film shown in FIG. 1 in roll form.

Referring to FIG. 1, exemplary multilayer fluoropolymer film described herein 100, having first layer 101, second layer 102, third layer 103, and optional fourth layer 104. First layer 101 comprises a first polymer, the first polymer comprises at least 35 mol percent tetrafluoroethylene comonomer, at least 15 mole percent vinylidene fluoride comonomer, and at least 5 mol percent hexafluoropropylene comonomer, based on the total mol percent of the first polymer. Second layer 102 comprises a second polymer, the second polymer comprises at least 50 mol percent vinylidene fluoride comonomer, based on the total mol percent of the second polymer. Third layer 103 comprises a third polymer, the third polymer comprises at least 50 mol percent methylmethacrylate comonomer, based on the total mol percent of the third polymer. Optionally, the third layer comprises a polyurethane. Optional fourth layer 104 comprises adhesive (e.g., pressure sensitive adhesive or hot melt adhesive). FIG. 2 shows exemplary multilayer fluoropolymer film described herein 100 in roll form 200.

The first layer of multilayer fluoropolymer films described herein comprises a first polymer, the first polymer comprises at least 35 (in some embodiments, at least 40, 45, 50, 55, 60, 65, 70, 75, or even up to 80; in some embodiments in a range from 35 to 80, or even 35 to 75) mol percent tetrafluoroethylene comonomer, at least 15 (in some embodiments, at least 20, 25, 30, 35, 40, 45, or even up to 50; in some embodiments, in a range from 15 to 50, 15 to 40, or even 15 to 35) mole percent vinylidene fluoride comonomer, and at least 5 (in some embodiments, at least 10, 15, or even at least 20; in some embodiments, in a range from 5 to 20, or even 7 to 15) mol percent hexafluoropropylene comonomer, based on the total mol percent of the first polymer. In some embodiments, the first polymer of multilayer fluoropolymer films described herein further comprises at least 0.5 (in some embodiments, at least 1, 5, 10, 25, or even at least 50; in some embodiments, in a range from 0.5 to 50, or even 1 to 10) mol percent perfluorovinylether comonomer, based on the total mol percent of the first polymer.

Exemplary fluoropolymers for the first layer include those available, for example, from 3M Dyneon, Oakdale, Minn., under the trade designations "FLUOROPLASTIC GRANULES THV221GZ" (39 mol % tetrafluoroethylene, 11 mol % hexafluoropropylene, and 50 mol % vinylidene fluoride), "FLUOROPLASTIC GRANULES THV2030GZ" (46.5 mol % tetrafluoroethylene, 16.5 mol % hexafluoropropylene, 35.5 mol % vinylidene fluoride, and 1.5 mol % perfluoropropyl vinylether), "FLUOROPLASTIC GRANULES THV610GZ" (61 mol % tetrafluoroethylene, 10.5 mol % hexafluoropropylene, and 28.5 mol % vinylidene fluoride), and "FLUOROPLASTIC GRANULES THV815GZ" (72.5 mol % tetrafluoroethylene, 7 mol % hexafluoropropylene, 19 mol % vinylidene fluoride, and 1.5 mol % perfluoropropyl vinylether).

The second layer of multilayer fluoropolymer films described herein comprises a second polymer, the second polymer comprises at least 50 (in some embodiments, 55, 60, 65, 70, 75, 80, 85, 90, 95, or even 100; in some embodiments, in a range from 50 to 100, 75 to 100, or even 85 to 100) mol percent vinylidene fluoride comonomer, based on the total mol percent of the second polymer. In some embodiments, the second layer of multilayer fluoropolymer films described herein comprises a second polymer, the second polymer comprises at least 0.5 (in some embodiments, 0.5 to 50, 1 to 50, 1 to 40, 1 to 30, 1 to 25, 1 to 20, or even 1 to 10) mol percent perfluorovinylether comonomer, at least 0.5 (in some embodiments, in a range from 0.5 to 50, 0.5 to 25, 1 to 25, or even 1 to 20) mol percent hexafluoropropylene comonomer, at least 0.5 (in some embodiments, in a range from 0.5 to 50, 0.5 to 25, 1 to 25, or even 1 to 20) mol percent chlorotrifluoroethylene comonomer, at least 0.1 (in some embodiments, at least 0.2, 0.3, 0.4, 0.5, or even at least 1; in some embodiments, 0.1 to 10, 1 to 20, 1 to 10, or even 1 to 5) wt. % UV absorber, and/or at least 0.05 (in some embodiments, at least 0.1, 0.3, 0.4, 0.5, or even at least 1; in some embodiments, 0.05 to 5, 0.1 to 5, or even 0.1 to 2) wt. % hindered amine light stabilizer (HALS), based on the total mol percent of the second layer. An exemplary embodiment of the second layer of fluoropolymer multilayer films described herein comprises a UVA oligomer and optional HALS oligomer.

Exemplary fluoropolymers for the second layer include those available from 3M Dyneon, Oakdale, Minn., under the trade designations "3M DYNEON FLUOROPLASTIC 6008/0001," "3M DYNEON FLUOROPLASTIC 11010/0000," and "3M DYNEON FLUOROPLASTIC 31508/0001."

In some embodiments, the first and/or second layers of the multilayer fluoropolymer film described herein further comprises inorganic pigments (e.g., titanium dioxide, zinc oxide, and/or zirconium dioxide).

The third layer of multilayer fluoropolymer films described herein comprises a third polymer, the third polymer comprises at least 50 (in some embodiments, 55, 60, 65, 70, 75, 80, 85, 90, 95, or even 100; in some embodiments, in a range from 50 to 100, 75 to 100, or even 85 to 100) mol percent methylmethacrylate comonomer, based on the total mol percent of the third polymer, and/or at least 0.1 (in some embodiments, at least 0.2, 0.3, 0.4, 0.5, 1, 5, 10, 15, 20, or even at least 25; in some embodiments, in a range from 0.1 to 50, 1 to 40, 10 to 40, 10 to 30) butylacrylate comonomer, based on the total weight of the third polymer. In some embodiments, the third layer comprises a polyurethane as the third polymer. In some embodiments, the third layer of multilayer fluoropolymer films described herein further comprises at least 0.1 (in some embodiments, at least 0.2, 0.3, 0.4, 0.5, or even at least 1; in some embodiments, 0.1 to 10, 1 to 20, 1 to 10, or even 1 to 5) wt. % UV absorber, at least 0.05 (in some embodiments, at least 0.1, 0.3, 0.4, 0.5, or even at least 1; in some embodiments, 0.05 to 5, 0.1 to 5, or even 0.1 to 2) wt. % hindered amine light stabilizer (HALS). An exemplary embodiment of the third layer of fluoropolymer multilayer films described herein comprises a UVA oligomer and optional HALS oligomer.

Exemplary polymers for the third layer of the multilayer fluoropolymer films described herein include polymethylmethacrylate (PMMA) (available, for example, from Arkema, Bristol, Pa., under the trade designation "VO44"), PMMA-butylacrylate block copolymer (available, for example, from Kuraray Ltd., Osaka, Japan, under the trade designation "LA4285"), and polymer blends thereof.

In some embodiments, the third layer of the multilayer fluoropolymer films described herein comprises UV absorbers, HALS, and/or anti-oxidants. A UV absorbing layer (e.g., a UV protective layer) can aid in protecting other layers or substrates from UV-light caused damage/degradation over time by absorbing UV-light (in some embodiments, any UV-light). In general, the UV-absorbing layer(s) may include any polymeric composition (i.e., polymer plus additives), including pressure-sensitive adhesive compositions, that is capable of withstanding UV-light for an extended period of time.

In some embodiments, the UV absorbers are red shifted UV absorbers (RUVA) that absorb at least 70% (in some embodiments, at least 80%, or even at least 90%) of the UV light in the wavelength region from 180 nm to 400 nm. Typically, it is desirable if the RUVA is highly soluble in polymers, highly absorptive, photo-permanent, and thermally stable in at least the temperature range from 200° C. to 300° C. for extrusion process to form the protective layer. In some embodiments, a RUVA is copolymerizable with monomers to form a protective coating layer by at least one of free radical initiator curing, UV curing, gamma ray curing, e-beam curing, or thermal curing processes. Exemplary UVAs are UVA oligomers as described, for example, in PCT Pub. Nos. WO2014/10055A1 (Olson et. al.) and WO2014/100580A1 (Olson et. al.), WO 2015/200655 (Olson et. al.), WO 2015/200669 (Olson et. al.), WO 2015/200657 (Olson et. al.), and WO 2016/210140 (Olson et. al.), the disclosure of which is incorporated herein by reference.

RUVAs typically have enhanced spectral coverage in the long-wave UV region (i.e., 300 nm to 400 nm), enabling it to block the high wavelength UV light that can cause yellowing in most polymers. Typical UV protective layers have thicknesses in a range from about 13 micrometers to 380 micrometers with a RUVA loading level in a range from about 2-10% by weight. Exemplary RUVAs include benzotriazole compound, 5-trifluoromethyl-2-(2-hydroxy-3-alpha-cumyl-5-tert-octylphenyl)-2H-benzotriazole (available under the trade designation "CGL-0139" from BASF Corporation, Florham, N.J.), benzotriazoles (e.g., 2-(2-hydroxy-3,5-di-alpha-cumylphehyl)-2H-benzotriazole, 5-chloro-2-(2-hydroxy-3-tert-butyl-5-methylphenyl)-2H-benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole), and 2(-4,6- diphenyl-1-3,5-triazin-2-yl)-5-hexyloxy-phenol. Additional commercially available RUVAs include those available from BASF Corporation under the trade designations "TINUVIN 1577," "TINUVIN 1600," and "TINUVIN 777." Other exemplary UV absorbers are available, for example, in a polymethylmethacrylate (PMMA) UVA master batch from Sukano Polymers Corporation, Duncan, S.C., under the trade designations "TA11-10 MB03." In some embodiments, the UV absorbers are used in combination with HALS and anti-oxidants.

Exemplary HALS include those available from BASF Corporation under the trade designations "CHIMASSORB 944" and "TINUVIN 123." Another exemplary HALS is available, for example, from BASF Corp., under the trade designation "TINUVIN 944."

Exemplary anti-oxidants include those available under the trade designations "IRGANOX 1010" and "ULTRANOX 626" from BASF Corporation.

In some embodiments, the fourth layer of multilayer fluoropolymer films described herein comprises at least one of an olefin copolymer, a polycarbonate polymer, or a urethane polymer.

Exemplary olefin copolymers for the optional fourth layer are available, for example, from E.I. DuPont de Nemours & Co., Wilmington, Del., under the trade designations "ELVAX" and "BYNEL."

An exemplary polycarbonate polymer for the optional fourth layer is available, for example, from SABIC Innovative Plastics, Pittsfield, Mass., under the trade designation "LEXAN."

An exemplary polyurethane polymer for either the third layer, or the optional fourth layer, is available, for example, from Lubrizol Advanced Materials, Cleveland, Ohio, under the trade designation "TECOFLEX."

Exemplary adhesives for the optional fourth layer include pressure sensitive adhesives and hot melt adhesives. Extrudable hot melt adhesives can be formed into pressure sensitive adhesives by extrusion blending with tackifiers. Exemplary pressure sensitive adhesives are available, for example, under the trade designations "OCA8171" and "OCA8172" from 3M Company, St. Paul, Minn. Extrudable pressure sensitive adhesives are commercially available, for example, from Kuraray, Osaka, Japan, under the trade designations "LIR-290," "LA2330," "LA2250," "LA2140E," and "LA1114;" and Exxon Mobil, Irving, Tex., under the trade designation "ESCORE."

Exemplary extrudable adhesives for the optional fourth layer include isobutylene/isoprene copolymers available, for example, from Exxon Mobil Corp., under the trade designations "EXXON BUTYL 065," "EXXON BUTYL 068," and "EXXON BUTYL 268" (believed to have an unsaturation in the range of about 1.05 to about 2.30 mole percent); United Chemical Products, Velizy-Villacoublay, France, under the trade designation "BK-1675N" (believed to have unsaturation of about 1.7 mole percent); LANXESS, Sarnia, Ontario, Canada, under the trade designation "LANXESS BUTYL 301" (believed to have unsaturation of about 1.85 mole percent), "LANXESS BUTYL 101-3" (believed to have unsaturation of about 1.75 mole percent), and "LANXESS BUTYL 402" (believed to have unsaturation of about 2.25 mole percent); and Kaneka, Osaka, Japan, under the trade designation "SIBSTAR" (available as both diblocks and triblocks with the styrene content believed to vary from about 15 to about 30 mole percent, based on the total moles of the copolymer). Exemplary polyisobutylene resins are commercially available, for example, from Exxon Chemical Co., Irving, Tex., under the trade designation "VISTANEX;" Goodrich Corp., Charlotte, N.C., under the trade designation "HYCAR;" and Japan Butyl Co., Ltd., Kanto, Japan, under the trade designation "JSR BUTYL."

In general, suitable polyisobutylenes may have a wide variety of molecular weights and a wide variety of viscosities. In some embodiments, the polyisobutylene has a weight average molecular weight (as measured by Gel Permeation Chromatography using polystyrene standards) of at least about 300,000 (in some embodiments, at least about 400,000, or even at least 500,000 or more) grams per mole. In some embodiments, the polyisobutylene has a weight average molecular weight of less than 300,000 (in some embodiments, up to 280,000, 275,000, 270,000, 260,000, 250,000, 240,000, 230,000, 220,000, 210,000, or up to 200,000) grams per mole. In some embodiments, when defined by the viscosity as measured by intrinsic viscosity at 20° C. in diisobutylene, the polyisobutylene has a viscosity average molecular weight in a range from 100,000 to 10,000,000 (in some embodiments, 500,000 to 5,000,000) grams per mole. Polyisobutylenes of many different molecular weights and viscosities are commercially available. In some embodiments, the molecular weight of the polyisobutylene changes during the process of making a PSA.

In some embodiments, PSAs comprising polyisobutylene, the PSA further comprises a hydrogenated hydrocarbon tackifier (in some embodiments, a poly(cyclic olefin)). In some embodiments, the hydrogenated hydrocarbon tackifier is present in a range from about 5 to about 90 percent by weight, based on the total weight of the PSA composition. In some embodiments, poly(cyclic olefin) is blended with about 10 to about 95 percent by weight polyisobutylene, based on the total weight of the PSA composition. In some embodiments, the PSA comprises hydrogenated hydrocarbon (e.g., poly(cyclic olefin)) tackifier in a range from about 5 to about 70 weight percent, based on the total weight of the PSA composition and about 30 to about 95 weight percent polyisobutylene, based on the total weight of the PSA composition. In some embodiments, a hydrogenated hydrocarbon tackifier (in some embodiments, the poly(cyclic olefin)) is present in an amount of less than 20 (in some embodiments, less than 15) percent by weight, based on the total weight of the PSA composition. For example, the hydrogenated hydrocarbon tackifier (in some embodiments, the poly(cyclic olefin)) may be present in a range from 5 to 19.95, 5 to 19, 5 to 17, 5 to 15, 5 to 13, or even 5 to 10 percent by weight, based on the total weight of the PSA composition. In some embodiments, the PSA is free of acrylic monomers and polyacrylates. Exemplary polyisobutylene PSAs include adhesive compositions comprising a hydrogenated poly(cyclic olefin) and a polyisobutylene resin such as those reported in PCT Pub. No. WO 2007/087281 (Fujita et al.), the disclosure of which is incorporated herein by reference.

Exemplary hydrogenated hydrocarbon tackifiers for the optional fourth layer are commercially available, for example, from Arakawa Chemical Industries Co., Ltd., Osaka, Japan, under the trade designations "ARKON P" and "ARKON M." These materials are described in the trade literature as being water white, hydrogenated hydrocarbon resins. Hydrogenated hydrocarbon tackifiers under the trade designation "ARKON P" (e.g., P-70, P-90, P-100, P-115, and P-140) are said to be fully hydrogenated while those under the trade designation "ARKON M" (e.g., M-90, M-100, M-115, and M-135) are partially hydrogenated. The hydrogenated hydrocarbon tackifier available under the trade designation "ARKON P-100" is said to have a number average molecular weight of about 850 grams/mole, a softening point of about 100° C., and a glass transition temperature of about 45° C. The hydrogenated hydrocarbon tackifier available under the trade designation "ARKON P-140" has a number average molecular weight of about 1250 grams/mole, a softening point of about 140° C., and a glass transition temperature of about 90° C. The hydrogenated hydrocarbon tackifier available under the trade designation "ARKON M-90" has a number average molecular weight of about 730 grams/mole, a softening point of about 90° C., and a glass transition temperature of about 36° C. The hydrogenated hydrocarbon tackifier available under the trade designation "ARKON-M-100" has a number average molecular weight of about 810 grams/mole, a softening point of about 100° C., and a glass transition temperature of about 45° C.

Other exemplary hydrogenated hydrocarbon tackifiers for the optional fourth layer are available, for example, from Exxon Chemical under the trade designations "ESCOREZ 1315," "ESCOREZ 1310LC," "ESCOREZ 1304," "ESCOREZ 5300," "ESCOREZ 5320," "ESCOREZ 5340," "ESCOREZ 5380," "ESCOREZ 5400," "ESCOREZ 5415," "ESCOREZ 5600," "ESCOREZ 5615," "ESCOREZ 5637," and "ESCOREZ 5690."

The "1300" series resins are described in the trade literature as being aliphatic resins with a high softening point. The "ESCOREZ 1315" resin is said to have a weight average molecular weight of about 2200 grams/mole, a softening point in the range of about 112° C. to about 118° C., and a glass transition temperature of about 60° C. The "ESCOREZ 1310LC" resin is said to have a light color, a weight average molecular weight of about 1350 grams/mole, a softening point of about 95° C., and a glass transition temperature of about 45° C. The "ESCOREZ 1304" resin is said to have a weight average molecular weight of about 1650 grams/mole, a softening point in the range of about 97° C. to about 103° C., and a glass transition temperature of about 50° C.

The "5300" series of resins are described in the trade literature as being water white, cycloaliphatic hydrocarbon resins, and have a weight average molecular weight in the range of about 370 grams/mole to about 460 grams/mole, a softening point in the range of about 85° C. to about 140° C., and a glass transition temperature in the range of about 35° C. to about 85° C.

The "5400" series of resins are described in the trade literature as being very light colored cycloaliphatic hydrocarbon resins, and have a weight average molecular weight in the range of about 400 grams/mole to about 430 grams/mole, a softening point in the range of about 103° C. to about 118° C., and a glass transition temperature in the range of about 50° C. to about 65° C.

The "5600" series of resins are described in the trade literature as being very light colored, aromatic modified cycloaliphatic resin, where the percent of aromatic hydrogen atoms is in the range of about 6 to about 12 weight percent based on the weight of all the hydrogen atoms in the resins. Further, the "5600" series of resins are said to have a weight average molecular weight in the range of about 480 grams/mole to about 520 grams/mole, a softening point in the range of about 87° C. to about 133° C., and a glass transition temperature in the range of about 40° C. to about 78° C.

Other exemplary suitable hydrogenated hydrocarbon tackifiers for the optional fourth layer are available, for example, from Eastman, Kingsport, Tenn., under the trade designations "REGALREZ 1085," "REGALREZ 1094," "REGALREZ 1126," "REGALREZ 1139," "REGALREZ 3102," and "REGALREZ 6108." These resins are described in the trade literature as hydrogenated aromatic pure monomer hydrocarbon resins. They have a weight average molecular weight ranging from about 850 grams/mole to about 3100 grams/mole, a softening temperature point in the range of about 87° C. to about 141° C., and a glass transition temperature in the range of about 34° C. to about 84° C. The "REGALEZ 1018" resin can be used in applications that do not generate heat. This tackifying resin has a weight average molecular weight of about 350 grams/mole, a softening point of about 19° C., and a glass transition temperature of about 22° C.

Other exemplary suitable hydrogenated hydrocarbon tackifiers for the optional fourth layer are available, for example, from Cray Valley, Exton, Pa., under the trade designations "WINGTACK 95" and "WINGTACK RWT-7850." The trade literature describes these tackifying resins as synthetic resins obtained by cationic polymerization of aliphatic $C_5$ monomers. The tackifying resin available under the trade designation "WINGTACK 95" is a light yellow solid with a weight average molecular weight of about 1700 grams/mole, a softening point of 98° C., and a glass transition temperature of about 55° C. The tackifying resin available under the trade designation "WINGTACK RWT-7850" is a light yellow solid with a weight average molecular weight of about 1700 grams/mole, a softening point of about 102° C., and a glass transition temperature of 52° C.

Other exemplary hydrogenated hydrocarbon tackifiers for the optional fourth layer are available, for example, from Eastman, under the trade designations "PICCOTAC 6095-E," "PICCOTAC 8090-E," "PICCOTAC 8095," "PICCOTAC 8595," "PICCOTAC 9095," and "PICCOTAC 9105." The trade literature describes these resins as aromatic modified, aliphatic hydrocarbon resin or as aromatic modified $C_5$ resins. The tackifier available under the trade designation "PICCOTACK 6095-E" has a weight average molecular weight of about 1700 grams/mole and a softening point of about 98° C. The tackifier available under the trade designation "PICCOTACK 8090-E" has a weight average molecular weight of about 1900 grams/mole and a softening point of about 92° C. The tackifier available under the trade designation "PICCOTACK 8095" has a weight average molecular weight of about 2200 grams/mole and a softening point of about 95° C. The tackifier available under the trade designation "PICCOTAC 8595" has a weight average molecular weight of about 1700 grams/mole and a softening point of about 95° C. The tackifier available under the trade designation "PICCOTAC 9095" has a weight average molecular weight of about 1900 grams/mole and a softening point of about 94° C. The tackifier available under the trade designation "PICCOTAC 9105" has a weight average molecular weight of about 3200 grams/mole and a softening point of about 105° C.

In some embodiments, the hydrogenated hydrocarbon tackifier is a hydrogenated poly(cyclic olefin) polymer. Poly(cyclic olefin) polymers generally have low moisture permeability and can impact the adhesive properties of the polyisobutylene resin, for example, by functioning as a tackifier. Exemplary hydrogenated poly(cyclic olefin) polymers include hydrogenated petroleum resins; hydrogenated terpene-based resins (e.g., those available from Yasuhara Chemical, Hiroshima, Japan, under the trade designation "CLEARON," in grades P, M, and K); hydrogenated resin or hydrogenated ester-based resins (available for example, from Hercules Inc., Wilmington, Del., under the trade designations "FORAL AX" and 'FORAL 105", and from Arakawa Chemical Industries Co., Ltd., Osaka, Japan, under the trade designations "PENCEL A," "ESTERGUM H," and "SUPER ESTER A"); disproportionate resins or disproportionate ester-based resins (available, for example, from Arakawa Chemical Industries Co., Ltd., under the trade designation "PINECRYSTAL"); a hydrogenated dicyclopentadiene-based resin (e.g., a hydrogenated $C_5$-type petroleum resin obtained by copolymerizing a $C_5$ fraction such as pentene, isoprene, or piperine with 1,3-pentadiene produced through thermal decomposition of petroleum naphtha (available, for example, from Exxon Chemical Co., under the trade designations "ESCOREZ 5300" and "ESCOREZ 5400", and from Eastman Chemical Co., under the trade designation "EASTOTAC H")); a partially hydrogenated aromatic modified dicyclopentadiene-based resin (available, for example, from Exxon Chemical Co., under the trade designation "ESCOREZ 5600"); a resin resulting from hydrogenation of a $C_9$-type petroleum resin obtained by copolymerizing a $C_9$ fraction such as indene, vinyltoluene and α- or β-methylstyrene produced by thermal decomposition of petroleum naphtha (available, for example, from Arakawa Chemical Industries Co., Ltd., under the trade designations "ARCON P" or "ARCON M"); and a resin resulting from hydrogenation of a copolymerized petroleum resin of the above-described $C_5$ fraction and $C_9$ fraction available, for example, from Idemitsu Petrochemical Co., Tokyo, Japan, under the trade designation "IMARV"). In some embodiments, the hydrogenated poly(cyclic olefin) is a hydrogenated poly(dicyclopentadiene), which may provide advantages to the PSA (e.g., low moisture permeability and transparency).

The hydrogenated hydrocarbon tackifier generally has a solubility parameter (SP value), which is an index for characterizing the polarity of a compound, that is similar to that of the polyisobutylene and exhibits good compatibility (i.e., miscibility) with the polyisobutylene so that a transparent film can be formed. The tackifying resins are typically amorphous and have a weight average molecular weight no greater than 5000 grams/mole. If the weight average molecular weight is greater than about 5000 grams/mole, compatibility with the polyisobutylene material may decrease, tackiness may decrease, or both. The molecular weight is often no greater than 4000 (in some embodiments no greater than 2500, 2000, 1500, 1000, or even no greater than 500; in some embodiments, the molecular weight is in the range of 200 to 5000, 200 to 4000, 200 to 2000 or even 200 to 1000) grams/mole.

PSA layers can be provided by techniques known in the art, such as hot melt extrusion of an extrudable composition comprising the components of the PSA composition. Advantageously, the PSA layer can be made by this process in the absence of solvents. Exemplary methods for making extrudable adhesives are described, for example, in PCT Pub. No. WO1995/016754A1 (Leonard et. al.), the disclosure of which is incorporated herein by reference.

In some embodiments, PSAs for the optional fourth layer comprise at least one of a UV absorber (UVA), a HALS, or an antioxidant. Exemplary UVAs include those described above in conjunction with multi-layer film substrates (e.g., those available from Ciba Specialty Chemicals Corporation under the trade designations "TINUVIN 328," "TINUVIN 326," "TINUVIN 783," "TINUVIN 770," "TINUVIN 479," "TINUVIN 928," "TINUVIN 1577," and "TINUVIN 1600"). In some embodiments, UVAs, when used, are present in a range from about 0.01 to about 10 percent by weight, based on the total weight of the PSA composition. Exemplary embodiments of UVAs for pressure sensitive adhesives include UVA oligomers as described in PCT Pub. No. WO 2016/210140 (Olson et. al.), the disclosure of which is incorporated herein by reference.

Exemplary antioxidants include hindered phenol-based compounds and phosphoric acid-based compounds, and those described above in conjunction with multi-layer film substrates (e.g., those available from Ciba Specialty Chemicals Corporation, under the trade designations "IRGANOX 1010," "IRGANOX 1076," and "IRGAFOS 126," and butylated hydroxytoluene (BHT)). In some embodiments, antioxidants, when used, are present in a range from about 0.01 to about 2 percent by weight, based on the total weight of the PSA composition.

Exemplary stabilizers include phenol-based stabilizers, hindered amine-based stabilizers (e.g., described above in conjunction with multi-layer film substrates and available from BASF, under the trade designation "CHIMASSORB 2020"), imidazole-based stabilizers, dithiocarbamate-based stabilizers, phosphorus-based stabilizers, and sulfur ester-based stabilizers. In some embodiments, such compounds, when used, are present in an amount from about 0.01 to about 3 percent by weight, based on the total weight of the PSA composition.

In some embodiments, multilayer fluoropolymer films described herein are co-extruded using techniques known in the art such as single screw extruders, twin screw extruders, and feeding a multi-manifold film die. A multi-manifold film die is capable, for example, of forming 3 polymer layers, or 4 polymers layers into a flat multilayer film that is coextruded onto a chilled casting roll that solidifies the multilayer film. Alternatively, for example, a multilayer feedblock can be used to bring the 3 polymer layers, or 4 polymer layers, or more than 4 polymer layers together before entering a single manifold die that forms the multiple polymer layers into a flat multilayer film, which is then coextruded onto a chilled casting roll that solidifies the multilayer film.

In some embodiments, the first layer of multilayer fluoropolymer films described herein has a thickness of at least 10 (in some embodiments, at least 15, 20, 25, 50, 75, or even at least 100; in some embodiments, in a range from 10 to 100, 10 to 50, 10 to 25, or even 10 to 20) micrometers. In some embodiments, the second layer has a thickness of at least 1 (in some embodiments, at least 5, 10, 15, 20, 25, 50, 75, or even at least 100; in some embodiments, in a range from 10 to 100, 10 to 50, 10 to 25, or even 10 to 20) micrometers. In some embodiments, the third layer of multilayer fluoropolymer films described herein has a thickness of at least 10 (in some embodiments, at least 15, 20, 25, 50, 75, 100, 150, or even at least 200; in some embodiments, in a range from 10 to 200, 10 to 100, or even 10 to 50) micrometers. In some embodiments, the fourth layer of multilayer fluoropolymer films described herein has a thickness of at least 1 (in some embodiments, at least 2, 3, 4, 5, 10, 15, 20, 25, 30, 40, or even at least 50; in some embodiments, in a range from 1 to 50, 1 to 30, or even 10 to 30) micrometers.

In some embodiments, there is an interlayer adhesion between the first and second layers of multilayer fluoropolymer films described herein of at least 40 (in some embodiments, at least 50, 75, 100, 150, 200, 250, 300, 350, 400, 450, or even at least 500; in some embodiments, in a range from 40 to 500 or even 50 to 500) g/cm. In some embodiments, there is an interlayer adhesion between the second and third layers of multilayer fluoropolymer films described herein of at least 40 (in some embodiments, at least 50, 75, 100, 150, 200, 250, 300, 350, 400, 450, or even at least 500; in some embodiments, in a range from 40 to 500 or even 50 to 500) g/cm. In some embodiments, there is an interlayer adhesion between the third layer and fourth layer of multilayer fluoropolymer films described herein of at least 40 (in some embodiments, at least 50, 75, 100, 150, 200, 250, 300, 350, 400, 450, or even at least 500; in some embodiments, in a range from 40 to 500 or even 50 to 500) g/cm. The interlayer adhesion is determined as described by the Interlayer Adhesion Test described in the Examples.

In some embodiments, the first layer of multilayer fluoropolymer films described herein have an exposed major surface with a CIE DE* color change of less than 1.5 as determined by the Graffiti Resistance Test described in the Examples. In some embodiments, multilayer fluoropolymer films described herein have an absorbance of at least 2 after 30,000 mJ/cm$^2$ exposure at 340 nm as determined by the UV Resistance Test described in the Examples using a method described in ASTM-G155-05a (October 2005). In some embodiments, the first layer of multilayer fluoropolymer films described herein have an exposed major surface with a percent gloss retention of at least 67 as determined by Solvent Resistance Test described in the Examples.

Due to the outdoor application, weathering is a desirable characteristic of the multilayer film described herein or articles having the film thereon. Accelerated weathering studies are one option for qualifying the performance of the multilayer film described herein or articles having the film thereto. Accelerated weathering studies are generally performed on films using techniques similar to those described in ASTM G-155-05a (October 2005), "Standard practice for exposing non-metallic materials in accelerated test devices that use laboratory light sources." The noted ASTM technique is considered as a sound predictor of outdoor durability for ranking material performance correctly.

In some embodiments, multilayer films described herein (including multilayer fluoropolymer films) are in the form of a roll. In some embodiments, the film is free of a release liner.

Figure 3:
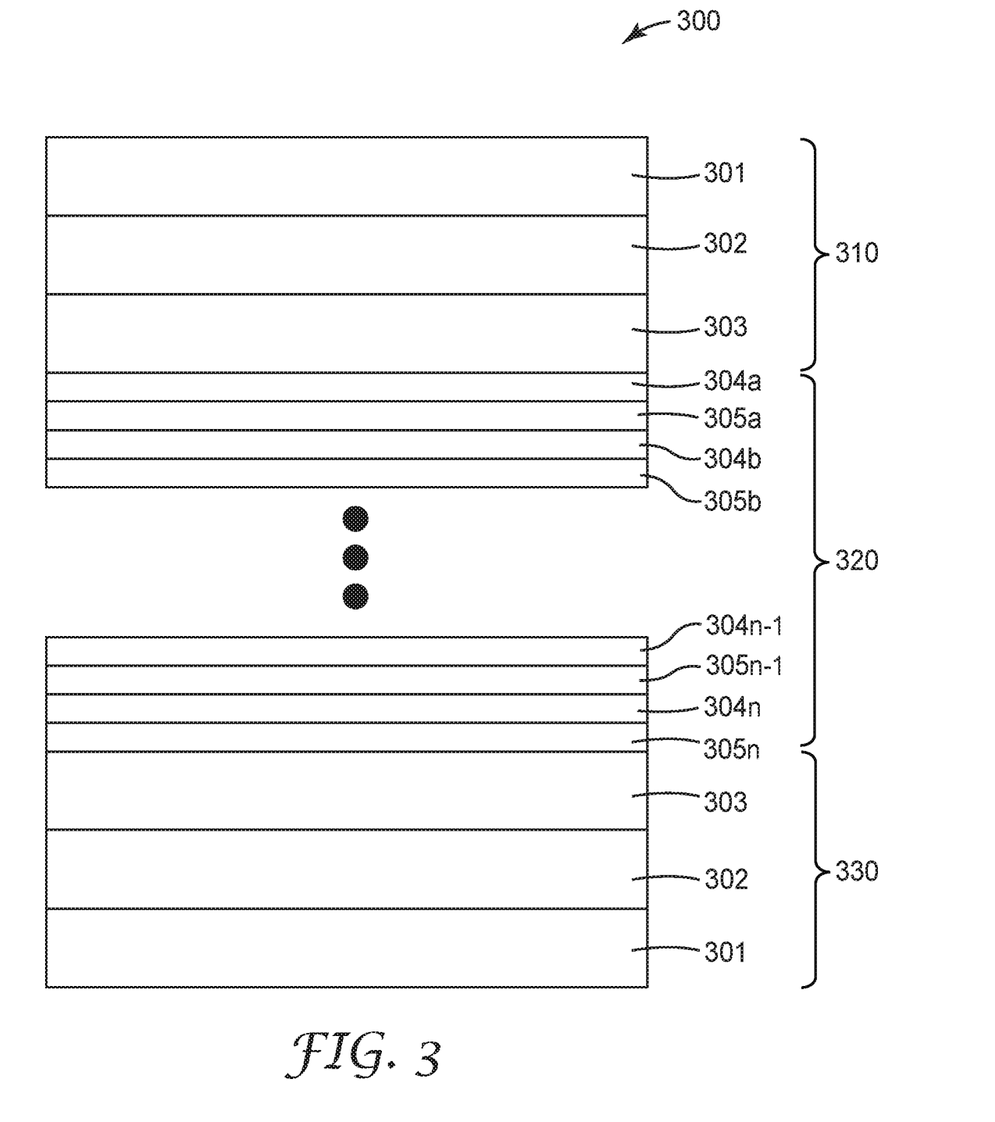
FIG. 3 is an exemplary multilayer fluoropolymer film shown as outer protective layer attached to a multilayer optical film.

In some embodiments, a composite multilayer optical film comprises a first and an optional second multilayer fluoropolymer film described herein, wherein, in order are, the first multilayer fluoropolymer film; a multilayer optical film that has first and second opposed major surfaces; and the optional second multilayer fluoropolymer film, wherein the third layer of the first multilayer fluoropolymer film is adjacent to the first major surface of the multilayer optical film, and wherein the third layer of the second multilayer fluoropolymer film is adjacent to the second major surface of the multilayer optical film. For example, referring to FIG. 3, composite multilayer optical film 300 has first and second optional multilayer fluoropolymer films described herein 310, 330, wherein, in order are, first multilayer fluoropolymer film 310, multilayer optical film 320, second multilayer fluoropolymer film 330. First multilayer fluoropolymer film 310 has first, second, and third layers, 311, 312, and 313, respectively. Optional second multilayer fluoropolymer film 330 has first, second, and third layers, 331, 332, and 333, respectively. Third layer 313 of first multilayer fluoropolymer film 310 is adjacent to first major surface layer 324a of multilayer optical film 320. The third layer of second multilayer fluoropolymer film 333 is adjacent to second major surface 325n of multilayer optical film 320.

a. The reflectivity of the multilayer optical film is proportional to the difference in index of refraction of the first optical layer and the second optical layer at the reflecting wavelength. The absolute difference in refractive index ($|n_1-n_2|$) may be less than 0.50 (in some embodiments, less than 0.30, 0.20, 0.10, or even less than 0.05). Higher refractive index differences between the first optical layer and the second optical layer create more optical power (e.g., reflectivity) thus enabling more reflective bandwidth.

b. By selecting the appropriate layer pairs, the number of layer pairs and/or the layer thickness, the multilayer optical film can be designed to transmit desired wavelengths of light.

c. Increasing the number of optical layers in the multilayer optical film may also provide more optical power. For example, if the refractive index between the layer pairs is small, the multilayer optical film may not achieve the desired reflectivity, however, by increasing the number of layer pairs, sufficient reflectivity may be achieved. In one embodiment of the present disclosure, the multilayer optical film comprises at least 2 first optical layers and at least 2 second optical layers (in some embodiments, at least 5 first optical layers and at least 5 second optical layers, at least 50 first optical layers and at least 50 second optical layers, or even at least 200 first optical layers and at least 200 second optical layers).

d. The thickness of each layer may also influence the performance of the multilayer optical film by either changing the reflectivity or shifting the reflectivity band. In some embodiments, the optical layers have an average individual layer thickness of about one quarter the wavelength of the wavelength of interest, and a layer pair thickness of about one half the wavelength of interest. For example, at 400 nanometers (nm), the average individual layer thickness would be about 100 nm, and the average layer pair thickness would be about 200 nm. Similarly, at 800 nm the average individual layer thickness would be about 200 nm, and the average layer pair thickness would be about 400 nm. First optical layers 324a, 324b, 324n-1, 324n, and second optical layers 325a, 325b, 325n-1, 325n, may have the same thicknesses. Alternatively, for example, the optical stack can include optical layers with different thicknesses to increase the reflective wavelength range.

Multilayer optical films described herein can be made using the general processing techniques known in the art coupled with the instant disclosure. Such techniques include those reported in U.S. Pat. No. 6,783,349 (Neavin et al.), the disclosure of which is incorporated herein by reference.

In some embodiments, techniques for providing a multilayer optical film with a controlled spectrum include the use of an axial rod heater to control the layer thickness values of coextruded polymer layers as reported, for example, in U.S. Pat. No. 6,783,349 (Neavin et al.); timely layer thickness profile feedback during production from a layer thickness measurement tool (e.g., an atomic force microscope (AFM), a transmission electron microscope, or a scanning electron microscope); optical modeling to generate the desired layer thickness profile; and repeating axial rod adjustments based on the difference between the measured layer profile and the desired layer profile.

The basic process for layer thickness profile control typically involves adjustment of axial rod zone power settings based on the difference of the target layer thickness profile and the measured layer profile. The axial rod power increase needed to adjust the layer thickness values in a given feedblock zone may first be calibrated in terms of watts of heat input per nanometer of resulting thickness change of the layers generated in that heater zone. For example, fine control of the spectrum is possible using 24 axial rod zones for 275 layers. Once calibrated, the necessary power adjustments can be calculated once given a target profile and a measured profile. The procedure can be repeated until the two profiles converge.

The layer thickness profile (layer thickness values) of multilayer optical film described herein reflecting at least 50 percent of incident UV light over a specified wavelength range can be adjusted, for example, to be approximately a linear profile with the first (thinnest) optical layers adjusted to have about a ¼ wave optical thickness (index times physical thickness) for 300 nm light, and progressing to the thickest layers that would be adjusted to be about ¼ wave optical thickness for 400 nm light.

Figure 4:
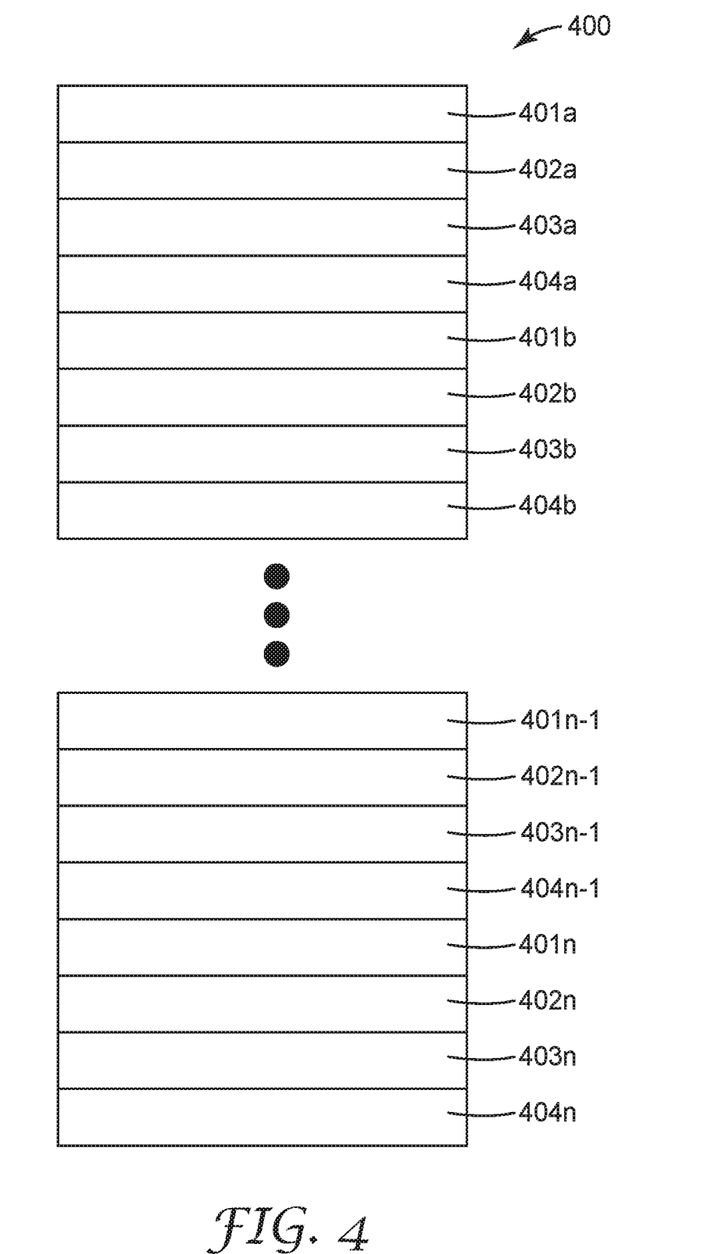
FIG. 4 is an exemplary multilayer fluoropolymer film shown as optical layers of a repeating optical stack in a multilayer optical film.

Referring to FIG. 4, the multilayer optical film 400 includes multiple alternating layers of at least first, second, and third diverse, substantially transparent polymeric optical layers 401, 402, and 403, with the layers being of an optical thickness of between about 0.03 and 0.45 micrometer. Each of the optical polymeric layers has a different refractive index, and the refractive index of the second polymeric material is intermediate the respective refractive indices of the first and third polymeric materials. The present invention can also provide an optical interference film, made of multiple layers of polymers, which reflect wavelengths of light in the infrared region of the spectrum while being substantially transparent to wavelengths of light in the visible spectrum.

In some embodiments, the multilayer optical interference film is made of three diverse substantially transparent optical polymeric layers and has repeating units where some are the same optical polymer. For example, referring to FIG. 4, optical polymeric layers 401, 402, and 403 and repeating unit of 401, 402, 403, 404, where 402 and 404 are the same optical polymer. In some embodiments, the optical polymer layers have thicknesses in a range from about 0.09 to about 0.45 micrometer, and each of the polymeric materials have a different index of refraction. In some embodiments, first optical polymeric layer 401 comprises THV, second optical polymeric layer 402 comprises CoPVDF, and third optical polymeric layer 403 comprises at least one of PMMA or CoPMMA or a polyurethane, and fourth optical polymeric layer 404 comprises CoPVDF. These polymers should have compatible rheologies for coextrusion, such that the melt viscosities of the polymers tend to be reasonably matched to prevent layer instability or non-uniformity. The multi-component optical interference films should have sufficient interfacial adhesion (>40 grams/centimeter) so that the films will not delaminate in their intended use.

An exemplary embodiment of a multilayer optical film described herein comprises a series of at least 100 repeating multilayer optical films comprising, in order, a pattern of first optical layer comprising a first fluoropolymer, a second optical layer comprising a second fluoropolymer, a third optical layer comprising a third polymer, and a fourth optical layer comprising the same fluoropolymer as the second layer, wherein all the optical polymer layers have thicknesses in a range from about 0.09 to about 0.45 micrometer, and wherein each of the first, second, and third polymer have a different index of refraction. Multilayer optical films with this repeating first layer, second layer, third layer, and fourth layer pattern have suppressed third order harmonics, and thus less color (visible light reflection) when reflecting infrared energy. Exemplary multilayer optical films described herein are capable, for example, of reflecting at least a 100 nm band width in the infrared spectra region of 1200 nm to 2100 nm with reduced third order harmonics in the visible light spectra region of 400 nm to 700 nm and thus have reduced color.

In some embodiments, a composite multilayer optical film comprises a first and an optional second multilayer fluoropolymer film described herein, wherein, in order are, the first multilayer fluoropolymer film; a multilayer optical film having first and second opposed major surfaces; and the optional second multilayer fluoropolymer film, wherein the third layer of the first multilayer fluoropolymer film is adjacent to the first major surface of the multilayer optical film, and wherein the third layer of the optional second multilayer fluoropolymer film is adjacent to the second major surface of the multilayer optical film.

Figure 5:
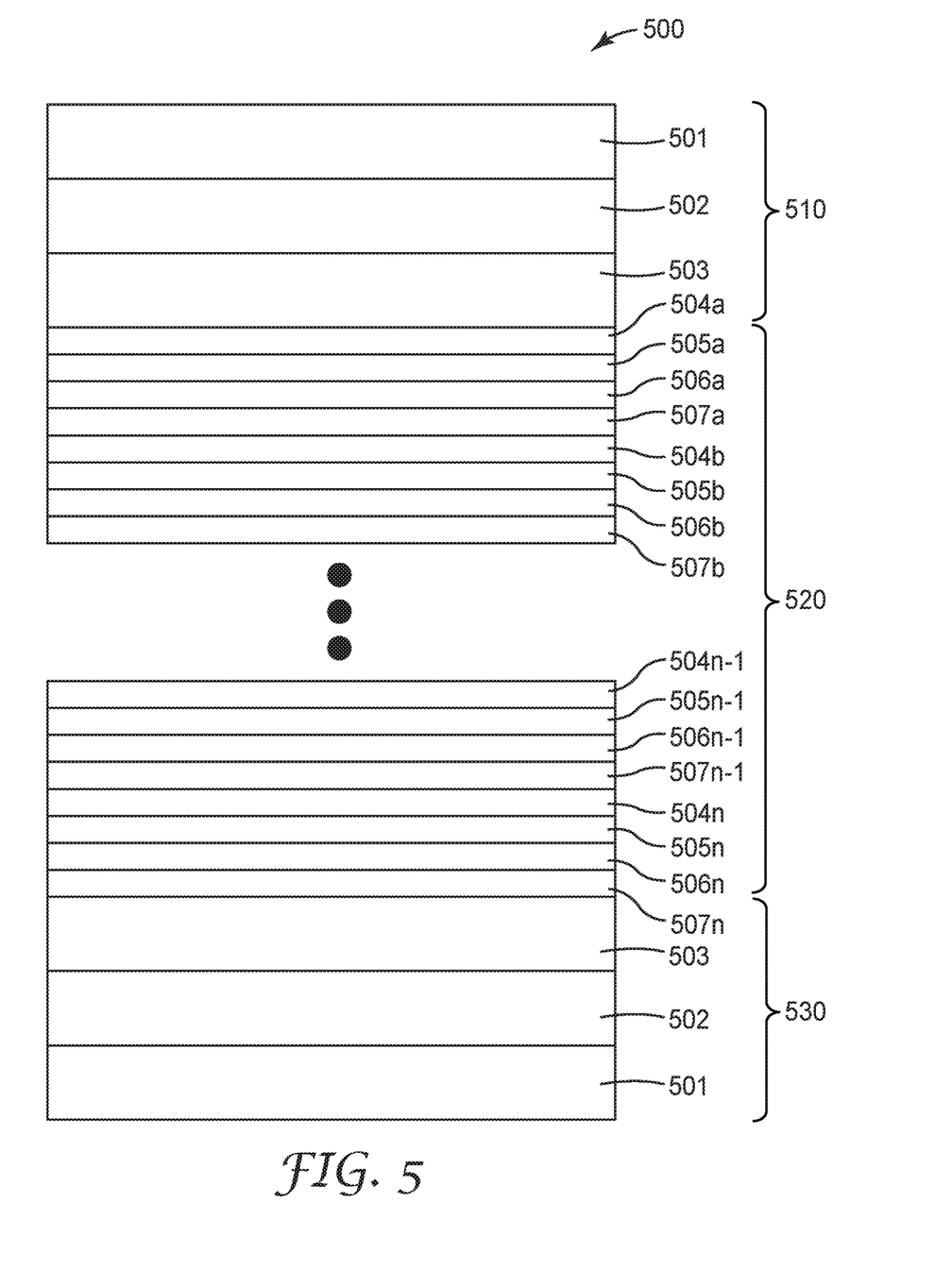
FIG. 5 is an exemplary multilayer fluoropolymer film shown as optical layers of a repeating optical stack in a multilayer optical film and as outer protective layers attached to the multilayer optical film.

For example, referring to FIG. 5, composite multilayer optical film 500 has first and optional second multilayer fluoropolymer films described herein 510, 530, wherein, in order are, first multilayer fluoropolymer film 510, multilayer optical film 520, optional second multilayer fluoropolymer film 530. First multilayer fluoropolymer film 510 has first, second, and third layers, 511, 512, and 513, respectively. Optional second multilayer fluoropolymer film 530 has first, second, and third layers, 531, 532, and 533, respectively. Third layer 513 of first multilayer fluoropolymer film 510 is adjacent to first major surface layer 524a of multilayer optical film 520. The third layer of optional second multilayer fluoropolymer film 533 is adjacent to second major surface layer 527n of multilayer optical film 520.

Figure 6:
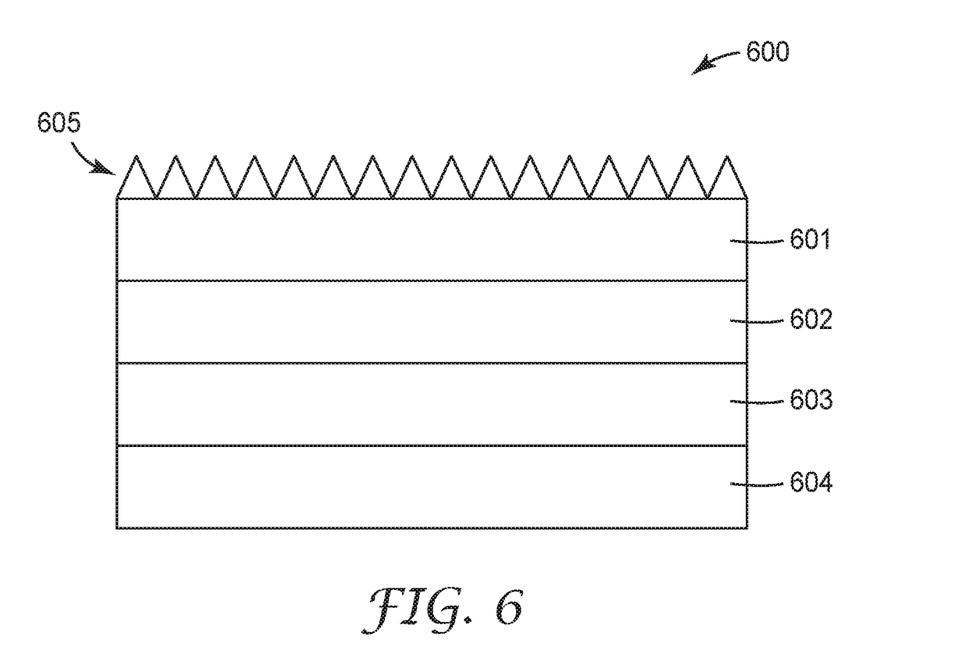
FIG. 6 is a schematic of an exemplary multilayer fluoropolymer film described herein having anti-reflective surface structure.

In some embodiments, the first layer of multilayer fluoropolymer films described herein having an anti-reflective surface structure on a major surface thereof. For example, referring to FIG. 6, multilayer fluoropolymer film 600 has first, second, and third layers, 601, 602, and 603, respectively, and optional fourth layer 604, having anti-reflective surface structure 605 on the first surface of the first layer 601. In some embodiments, the first layer 601 and the anti-reflective surface structure 605 are comprised of the same material.

An anti-reflective surface structure can be provided onto a film surface by techniques known in the art. For example, extrusion replication utilizes a tool that will impart the negative structure in the polymer surface. The tooling can be of a variety of forms and materials (e.g., metal or polymer). In some embodiments, the tooling is a sheet, roll, or belt of surface structured film. For metal tools, the metal is generally diamond-machined, embossed, knurled, sandblasted, etc. to form the surface structure. The structured polymer surface is generally formed by extrusion replication where a thermoplastic resin such as a fluoropolymer is extruded using standard extrusion equipment and fed through a die and into a nip with a machined metal tool roll and a rubber roll. The molten polymer is quenched while in contact with the tool surface, which then releases from the tool roll and is wound on a roll.

An anti-reflective surface structure can also be provided by heating a polymeric film and then contacting it with an embossing roll or belt having a desired structured surface thus imparting the negative of the surface pattern into the polymeric film.

The use of anti-reflective structured films provide a reduction in the amount of light that is reflected and does not, for example, reach a light absorbing element(s) of, for example, a light energy absorbing device. For example, such anti-reflective structured films may enable conventional photovoltaic solar modules to experience increased average power output. Anti-reflective structured films can aid in maintaining the transparency to light of such anti-reflective structured films, during the life of the light energy absorbing device. In this way, the films can help to increase the transmission of light to a light energy absorbing device.

Light energy absorbing devices, and especially the structured face of the anti-reflective structured film, may be exposed to a variety of detrimental conditions from outside environments. For example, the structured face can be exposed to environmental elements such as rain, wind, hail, snow, ice, and blowing sand, which can damage the structured surface of the structured face. In addition, long term exposure to other environmental conditions such as heat and UV radiation exposure from the sun can also cause degradation of the structured face. For example, many polymeric organic materials are susceptible to breaking down upon repeated exposure to UV radiation. Weatherability for light energy absorbing devices such as, for example, a solar energy conversion device is generally measured in years, because it is desirable that the materials be able to function for years without deterioration or loss of performance. It is desirable for the materials to be able to withstand up to 20 years of outdoor exposure without significant loss of optical transmission or mechanical integrity. Typical polymeric materials are not able to withstand outdoor exposure without loss of optical transmission or mechanical integrity for extended periods of time, such as 20 years. In at least some embodiments, the structured face of some embodiments of films described herein may exhibit dirt resistance and/or mechanical durability in the range of from at least about 5 years to at least about 20 years, and possibly longer (e.g., at least about 25 years). In addition, because it is made of a UV stable polymeric material, the structured face may exhibit long term UV stability of at least about 15 years, at least about 20 years, or even at least about 25 years.

In some embodiments, the surface structure comprises prisms. In some embodiments, the prisms each comprise a prism tip angle in the range of from 15 degrees to 75 degrees and a pitch in the range of from 10 micrometers to 250 micrometers. In some embodiments, the prisms each comprise an average slope angle in the range of from 15 degrees to 75 degrees and a pitch in the range of from 10 micrometers to 250 micrometers. In some embodiments, the prisms have a trough to peak height in the range of from 10 micrometers to 250 micrometers. The prisms can be provided by techniques known in the art, including those described in the microreplication techniques discussed above.

In some embodiments, the transparent film has a machine direction and the surface structure comprises prisms that have linear grooves parallel to the machine direction of the film. Such a film can be made by techniques known in the art (e.g., by utilizing a tool having parallel and linear grooves provided circumferentially around the tool).

In some embodiments, the anti-reflective structures are in the form of at least one of a prismatic, pyramidal, conical, hemispherical, parabolic, cylindrical, or columnar structure. In some embodiments, the anti-reflective structures comprise prisms having a prism tip angle of less than 90 degrees (in some embodiments, less than or equal to about 60 degrees, less than or equal to about 30 degrees; in the range of from about 10 degrees up to about 90 degrees). Such anti-reflective prism structure may also exhibit a trough-to-trough or peak-to-peak pitch in the range of from about 2 micrometers to about 2 cm. The anti-reflective structures comprising prisms may also have a prism tip angle in the range of from about 15 degrees to about 75 degrees. The anti-reflective structures comprising prisms may also have a pitch in the range of from about 10 micrometers to about 250 micrometers.

In some embodiments, an anti-reflective structured surface layer minimizes surface reflections. Incident solar rays are partially reflected off the sloped surfaces of the structured surface. These partially reflected solar rays, however, reflect onto the adjacent surface structure where they are either refracted directly to the solar energy conversion device, or are totally internally reflected to the solar energy conversion device. Almost all of the incident solar rays eventually reach the solar energy conversion device, thus increasing its efficiency.

Exemplary structured layers include those having a structured surface comprising a series of structures. The structured layer may be a single material or may be a multilayer construction, where the structured layer comprises one material formulation, and a base film and adhesive comprising different material formulations. Additionally, the film and adhesive layers may themselves comprise multiple layers. Generally, the structured layer has a structured surface, wherein a substantial portion of reflected light intersects another structure on the surface. In some embodiments, the series of structures comprise a series of essentially parallel peaks separated by a series of essentially parallel valleys. In cross-section, the structured layer may assume a variety of wave forms. For example, the cross section may assume a symmetric saw tooth pattern, in which each of the peaks are identical, as are each of the valleys; a series of parallel peaks that are of different heights, separated by a series of parallel valleys; or a saw tooth pattern of alternating, parallel, asymmetric peaks separated by a series of parallel, asymmetric valleys. In some embodiments, the peaks and valleys are continuous and in other embodiments a discontinuous pattern of peaks and valleys is also contemplated. Thus, for example, the peaks and valleys may terminate for a portion of the article. The valleys may either narrow or widen as the peak or valley progresses from one end of the article to the other. Still further, the height and/or width of a given peak or valley may change as the peak or valley progresses from one end of the article to the other.

In some embodiments, the structured surface is opposite an energy conversion device, and the structured surface is antireflective. An antireflective, structured surface means, for the purpose of the present application, that reflection, averaged over all angles of incidence, is less than it would be on a corresponding flat surface, for example, is less than 50% of the reflection off the flat surface (in some embodiments less than 60%, 70%, or even less than 80% of the reflection off the flat surface).

The dimensions of the peaks generally have a height of at least about 10 micrometers. In some embodiments, peaks have a height up to about 250 micrometers. In one embodiment, for example, the peaks are at least about 20 micrometers high, and in another exemplary embodiment, the peaks are up to about 150 micrometers high. The peak-to-peak spacing between adjacent peaks is generally at least about 10 micrometers. In some embodiments, the spacing is up to about 250 micrometers. In some embodiments, the spacing is at least about 20 micrometers, and in some embodiments, the spacing is as much as about 150 micrometers. The included angle between adjacent peaks can also vary. The valleys may, for example, be flat, round, parabolic, or V-shaped. The peaks are generally V-shaped and have an apex angle of less than 60 degrees (in some embodiments, less than 50 degrees, or even less than 40 degrees). In some embodiments the peaks have a radius of curvature at the tip, and such an embodiment has an apex angle measured by the best fit line to the sides.

In some embodiments, the series of structures are non-uniform structures. For example, the structures differ in height, base width, pitch, apex angle, or other structural aspect. In such embodiments, the slope of the structures from the plane of the surface averages over the surface less than 30 degrees from normal. In some embodiments, for example, the structures are substantially symmetric in one dimension around a perpendicular plane to the surface.

Advantages of embodiments of multilayer fluoropolymer films described herein include desirable resistance to staining, UV damage, and/or solvent damage. Some embodiments of multilayer fluoropolymer films described herein are useful, for example, in multilayer film applications (e.g., on retro-reflective traffic signs, commercial graphics, automotive paint, windows, windshields, building exteriors, and photovoltaics).

Exemplary Embodiments

1. A multilayer fluoropolymer film comprising, in order:
a first layer comprising a first polymer, the first polymer comprising at least 35 (in some embodiments, at least 40, 45, 50, 55, 60, 65, 70, 75, or even up to 80; in some embodiments in a range from 35 to 80, or even 35 to 75) mol percent tetrafluoroethylene comonomer, at least 15 (in some embodiments, at least 20, 25, 30, 35, 40, 45, or even up to 50; in some embodiments, in a range from 15 to 50, 15 to 40, or even 15 to 35) mole percent vinylidene fluoride comonomer, and at least 5 (in some embodiments, at least 10, 15, or even at least 20; in some embodiments, in a range from 5 to 20, or even 7 to 15) mol percent hexafluoropropylene comonomer, based on the total mol percent of the first polymer;
a second layer comprising a second polymer, the second polymer comprising at least 50 (in some embodiments, 55, 60, 65, 70, 75, 80, 85, 90, 95, or even 100; in some embodiments, in a range from 50 to 100, 75 to 100, or even 85 to 100) mol percent vinylidene fluoride comonomer, based on the total mol percent of the second polymer; and
a third layer comprising a third polymer, the third polymer comprising at least 50 (in some embodiments, 55, 60, 65, 70, 75, 80, 85, 90, 95, or even 100; in some embodiments, in a range from 50 to 100, 75 to 100, or even 85 to 100) mol percent methylmethacrylate comonomer, based on the total mol percent of the third polymer.

2. The multilayer fluoropolymer film of Exemplary Embodiment 1, wherein the first polymer further comprises at least 0.5 (in some embodiments, at least 1, 5, 10, 25, or even at least 50; in some embodiments, in a range from 0.5 to 50, or even 1 to 10) mol percent perfluorovinylether comonomer, based on the total mol percent of the first polymer.

3. The multilayer fluoropolymer film of any preceding Exemplary Embodiment, wherein the second polymer further comprises at least 1 (in some embodiments, 0.5 to 50, 1 to 50, 1 to 40, 1 to 30, 1 to 25, 1 to 20, or even 1 to 10) mol percent perfluorovinylether comonomer, based on the total mol percent of the second polymer.

4. The multilayer fluoropolymer film of any preceding Exemplary Embodiment, wherein the second polymer further comprises at least 0.5 (in some embodiments, at least 1; in some embodiments, in a range from 0.5 to 50, 0.5 to 25, 1 to 25, or even 1 to 20) mol percent hexafluoropropylene comonomer, based on the total mol percent of the second polymer.

5. The multilayer fluoropolymer film of any preceding Exemplary Embodiment, wherein at least one of the second or third layers further comprise at least 0.1 (in some embodiments, at least 0.2, 0.3, 0.4, 0.5, or even at least 1; in some embodiments, 0.1 to 10, 1 to 20, 1 to 10, or even 1 to 5) wt. % UV absorber, based on the total weight of the second or third layer, respectively.

6. The multilayer fluoropolymer film of any preceding Exemplary Embodiment, wherein at least one of the second or third layers further comprise at least 0.05 (in some embodiments, at least 0.1, 0.3, 0.4, 0.5, or even at least 1; in some embodiments, 0.05 to 5, 0.1 to 5, or even 0.1 to 2) wt. % hindered amine light stabilizer (HALS), based on the total weight of the second or third layer, respectively.

7. The multilayer fluoropolymer film of any preceding Exemplary Embodiment, wherein the third layer further comprises at least 0.1 (in some embodiments, at least 0.2, 0.3, 0.4, 0.5, 1, 5, 10, 15, 20, or even at least 25; in some embodiments, in a range from 0.1 to 50, 1 to 40, 10 to 40, 10 to 30) mol. % butylacrylate comonomer, based on the total mol percent of the third layer.

8. The multilayer fluoropolymer film of any preceding Exemplary Embodiment, wherein the first layer further comprises at least 0.1 (in some embodiments, at least 0.2, 0.3, 0.4, 0.5, 1, 5, 10, 15, 20, or even at least 25; in some embodiments, in a range from 0.1 to 50, 1 to 40, 10 to 40, or even 10 to 30) wt. % inorganic pigment (e.g., titania dioxide, zinc oxide, and zirconium dioxide), based on the total weight of the first layer.

9. The multilayer fluoropolymer film of any preceding Exemplary Embodiment, wherein the second layer further comprises at least 0.1 (in some embodiments, at least 0.2, 0.3, 0.4, 0.5, 1, 5, 10, 15, 20, or even at least 25; in some embodiments, in a range from 0.1 to 50, 1 to 40, 10 to 40, or even 10 to 30) wt. % inorganic pigment (e.g., titania dioxide, zinc oxide, and zirconium dioxide), based on the total weight of the second layer.

10. The multilayer fluoropolymer film of Exemplary Embodiment 1 further comprising a fourth layer comprising adhesive (e.g., pressure sensitive adhesive or hot melt adhesive), wherein the order of the layers are the first layer, the second layer, the third layer, and the fourth layer.

11. The multilayer fluoropolymer film of any preceding Exemplary Embodiment, wherein the fourth layer has a thickness of at least 1 (in some embodiments, at least 2, 3, 4, 5, 10, 15, 20, 25, 30, 40, or even at least 50; in some embodiments, in a range from 1 to 50, 1 to 30, or even 10 to 30) micrometers.

12. The multilayer fluoropolymer film of any preceding Exemplary Embodiment, wherein an interlayer adhesion between the third layer and fourth layer as determined by the Interlayer Adhesion Test of at least 40 (in some embodiments, at least 50, 75, 100, 150, 200, 250, 300, 350, 400, 450, or even at least 500; in some embodiments, in a range from 40 to 500 or even 50 to 500) g/cm, wherein the fourth layer comprises at least one of a polyolefin copolymer, a polycarbonate polymer, or a polyurethane polymer.

13. The multilayer fluoropolymer film of any preceding Exemplary Embodiment having an interlayer adhesion between the first and second layers as determined by the Interlayer Adhesion Test of at least 40 (in some embodiments, at least 50, 75, 100, 150, 200, 250, 300, 350, 400, 450, or even at least 500; in some embodiments, in a range from 40 to 500 or even 50 to 500) g/cm.

14. The multilayer fluoropolymer film of any preceding Exemplary Embodiment having an interlayer adhesion between the second and third layers as determined by the Interlayer Adhesion Test of at least 40 (in some embodiments, at least 50, 75, 100, 150, 200, 250, 300, 350, 400, 450, or even at least 500; in some embodiments, in a range from 40 to 500 or even 50 to 500) g/cm.

15. The multilayer fluoropolymer film of any preceding Exemplary Embodiment, wherein the first layer has an exposed major surface with a CIELAB DE* color change of less than 1.5 according to the Graffiti Resistance Test Method.

16. The multilayer fluoropolymer film of any preceding Exemplary Embodiment having an Absorbance Value of at least 2, measured after exposure to 30,000 mJ/cm$^2$ according to ASTM G-155-05a (October 2005).

17. The multilayer fluoropolymer film of any preceding Exemplary Embodiment, wherein the first layer has an exposed major surface having a percent gloss retention of greater than 67 according to Solvent Resistance Test Method.

18. The multilayer fluoropolymer film of any preceding Exemplary Embodiment, wherein the multilayer fluoropolymer film is a co-extruded film.

19. The multilayer fluoropolymer film of any preceding Exemplary Embodiment, wherein the first layer has a thickness of at least 10 (in some embodiments, at least 15, 20, 25, 50, 75, or even at least 100; in some embodiments, in a range from 10 to 100, 10 to 50, 10 to 25, or even 10 to 20) micrometers.

20. The multilayer fluoropolymer film of any preceding Exemplary Embodiment, wherein the second layer has a thickness of at least 1 (in some embodiments, at least 5, 10, 15, 20, 25, 50, 75, or even at least 100; in some embodiments, in a range from 10 to 100, 10 to 50, 10 to 25, or even 10 to 20) micrometers.

21. The multilayer fluoropolymer film of any preceding Exemplary Embodiment, wherein the third layer has a thickness of at least 10 (in some embodiments, at least 15, 20, 25, 50, 75, 100, 150, or even at least 200; in some embodiments, in a range from 10 to 200, 10 to 100, or even 10 to 50) micrometers.

22. The multilayer fluoropolymer film of any preceding Exemplary Embodiment, wherein the first layer has first and second opposed major surfaces, wherein the first major surface of the first layer is an anti-reflective surface structure.

23. A roll of the multilayer fluoropolymer film of any preceding Exemplary Embodiment.

24. The roll of Exemplary Embodiment 23 that is free of a release liner.

25. A multilayer optical film comprising, in order:
the multilayer fluoropolymer film of any preceding Exemplary Embodiment; and
a multilayer optical film having first and second opposed major surfaces, wherein the third layer of the multilayer fluoropolymer film is adjacent to the first major surface of the multilayer optical film.

26. A multilayer optical film comprising a first and a second multilayer fluoropolymer film of any of Exemplary Embodiments 1 to 24, wherein, in order are:
the first multilayer fluoropolymer film; and
a multilayer optical film having first and second opposed major surfaces; and
the second multilayer fluoropolymer film, wherein the third layer of the first multilayer fluoropolymer film is adjacent to the first major layer of the multilayer optical film, and wherein the third layer of the second multilayer fluoropolymer film is adjacent to the second major surface of the multilayer optical film.

27. A multilayer film comprising a series of at least 100 repeating multilayer fluoropolymer films of any of Exemplary Embodiments 1 to 24.

28. A multilayer optical film comprising a series of at least 100 repeating multilayer fluoropolymer films comprising, in order, a pattern of a first optical layer comprising a first fluoropolymer, a second optical layer comprising a second fluoropolymer, a third optical layer comprising a third polymer, and a fourth optical layer comprising the same fluoropolymer as the second layer, wherein all the optical polymer layers have thicknesses in a range from 0.09 to 0.45 micrometer, and wherein each of the first, second, and third polymer have a different index of refraction.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Interlayer Adhesion Test

The Interlayer Adhesion Test method was determined using ASTM D-1876 as a guide. More specifically, the test method used to measure interlayer adhesion was as follows. The multilayer film to be tested was cut into 25 cm long by 2.5 cm wide pieces. Each piece was laminated to the center of a 25 cm long by 7.5 cm wide glass plate using 2.5 cm wide double stick tape (obtained from 3M Company, St. Paul, Minn., under the trade designation "#665"). One end of the taped film assembly was cut back 1 cm from one end with a razor blade. To each laminate a 2.5 cm wide single sided tape (obtained from 3M Company under the trade designation ("#396")) was applied. Then the single sided tape was snapped back over the scored film to initiate delamination of the multilayer film and create an attachment tab. The film-glass plate assembly was installed into the plate holder on a slip/peel tester (obtained from IMASS Inc., Accord, Mass., under the trade designation "MODEL SP-2000"). The slip/peel tester speed was set at 150 cm/min. The film/tape attachment tab was attached to the transducer clamp of the slip/peel tester. The average force to delaminate the film over a 24 cm length was recorded. The interlayer adhesion value reported was the average based on testing 5 samples of the film. If the multilayer film could not be peeled apart at layer interface then the interlayer adhesion equivalent to maximum force measurable by the force transducer (i.e., 400 grams/centimeter) was recorded.

Graffiti Resistance Test

The Graffiti Resistance Test Method was determined using ASTM D6578/D6578 as a guide. More specifically, the test method was as follows. Retro-reflective film (obtained from 3M Company, under the trade designation "3M ADVANCED ENGINEER GRADE PRISMATIC SHEETING 7930") was laminated to a 625 micrometer thick by 6.9 cm wide by 27.9 cm long aluminum sheet using a transfer adhesive (obtained from 3M Company, under the trade designation "SCOTCH 7951 LAMINATING ADHESIVE"). The multilayer film to be tested was laminated to the retro-reflective film-aluminum sheet assembly using a transfer adhesive ("SCOTCH 7951 LAMINATING ADHESIVE"). The surface gloss of the laminated film to be tested was measured using a gloss meter (obtained from BYK-Gardner, Columbia, Md., under the trade designation "MICRO-TRI-GLOSS"). The color of the surface of the film to be tested was measured using a colorimeter (obtained from Hunter Lab, Reston, Va., under the trade designation "COLORFLEX EZ"). A 2.5 cm by 2.5 cm square surface of ink from a blue marker (obtained from Sanford L.P., Oak Brook, Ill., under the trade designation "SHARPIE PERMANENT MARKER") was applied to the surface of the film to be tested. The blue marker ink was allowed to dry for at least 24 hours. The blue marker ink was vigorously rubbed off the film using a cloth (obtained from Kimberly Clark, Roswell, Ga., under the trade designation "WYPALL L40"). The gloss of the film surface where the marker ink was been rubbed off was measured using the gloss meter ("MICRO-TRI-GLOSS"). The Delta E color change of the surface where the marker had been rubbed off was measured using the colorimeter ("COLORFLEX EZ").

The steps in the preceding paragraph were repeated except rather than applying the marker ink, green spray paint (obtained from Rust-Oleum Corporation, Vernon Hills, Ill., under the trade designation "211360 DARK HUNTER GREEN") was applied to a 2.5 cm by 2.5 cm square of the film surface to be tested different from any area previously tested. The steps in the preceding paragraph were repeated except rather than applying the maker ink, burgundy spray paint (obtained from Rust-Oleum Corporation, under the trade designation "7768 BURGUNDY") was applied to a 2.5 cm by 2.5 cm square of the film surface to be tested different from any area previously tested.

The steps in the preceding paragraphs were repeated except rather than using a dry cloth, the cloth was saturated with 10 ml of isopropyl alcohol (IPA).

The steps in the preceding paragraphs were repeated except rather than using a dry cloth, the cloth was saturated with 10 ml of methyl ethyl ketone (MEK).

UV Resistance Test

The UV Resistance Value was determined as described in ASTM G155-05a (October 2005), the disclosure of which is incorporated herein by reference, and then the sample absorbance was measured at 340 nm after exposure to 30,000 mJ/cm$^2$ at 340 nm.

Solvent Resistance Test

The Solvent Resistance Test Method was determined using ASTM D7835/D7835M-13 as a guide. More specifically, the test method used to measure Solvent Resistance was as follows. Retro-reflective film (obtained from 3M Company, under the trade designation "3M ADVANCED ENGINEER GRADE PRISMATIC SHEETING 7930") was laminated to a 625 micrometer thick by 6.9 cm wide by 27.9 cm long aluminum sheet using a transfer adhesive (obtained from 3M Company, under the trade designation "SCOTCH 7951 LAMINATING ADHESIVE"). The multilayer film to be tested was laminated to the retro-reflective film-aluminum sheet assembly using ("SCOTCH 7951 LAMINATING ADHESIVE"). The surface gloss of the laminated film to be tested was measured using the gloss meter ("MICRO-TRI-GLOSS"). The surface of the film to be tested was rubbed with a cloth ("WYPALL L40") that had been saturated with 10 ml of isopropyl alcohol (IPA) using a wear tester (obtained from Paul N. Gardner Company, Pompano Beach, Fla., under the trade designation "WASHABILITY AND WEAR TESTER MODEL D10V") under the following conditions: a 404 gram sled with 3.5 cm by 8.5 cm foot print, 40 passes of the sled at 33 cm/sec. The gloss of rubbed film surface tested using the gloss meter ("MICRO-TRI-GLOSS").

The steps in the preceding paragraph were repeated except methyl ethyl ketone (MEK) was used in place of the isopropyl alcohol, and the portion of the film tested was different from any area previously tested. The steps in the preceding paragraph were repeated except acetone was used in place of the isopropyl alcohol, and the portion of the film tested was different from any area previously tested.

Example 1

A multilayer polymeric film was made by coextruding polymethylmethacrylate (PMMA) (obtained from Arkema, Bristol, Pa., under the trade designation "VO44") as the third layer with a fluoropolymer (obtained from 3M Dyneon, Oakdale, Minn., under the trade designation "FLUOROPLASTIC GRANULES THV221GZ") as the first layer, and a fluoropolymer (obtained from 3M Dyneon, Oakdale, Minn., under the trade designation "3M DYNEON FLUOROPLASTIC PVDF 11010/0000") as the second layer using a 3 layer multi-manifold die. The PMMA ("VO44") third layer was fed to the bottom manifold of the multi-manifold die with a 25 mm twin screw extruder at 1.8 kg/hr. (4 lbs./hr.). The fluoropolymer ("3M DYNEON FLUOROPLASTIC GRANULES PVDF 11010/0000") second layer was fed to the center manifold of the multi-manifold die with a 31 mm single screw extruder at 1.8 kg/hr. (4 lbs./hr.). The fluoropolymer ("FLUOROPLASTIC GRANULES THV221GZ") first layer was fed to the top manifold of multi-manifold die with a 31 mm single screw extruder at 1.8 kg/hr. (4 lbs./hr.). The multilayer polymeric film was cast onto a chilled roll at 5.54 meters/minute (18 fpm) to a thickness of 75 micrometers.

The layers of this multilayer polymeric film could not be peeled apart following the Interlayer Adhesion Test method, which indicated the interlayer adhesion was at least 400 grams/cm.

Example 2

A multilayer polymeric film was made by coextruding a fluoropolymer first layer ("FLUOROPLASTIC GRANULES THV221GZ") and fluoropolymer ("3M DYNEON FLUOROPLASTIC GRANULES PVDF 11010/0000") as the second layer using a 3 layer multi-manifold die. The third layer was created using a 50:50 blend of PMMA butylacrylate copolymer (obtained from Kuraray Ltd., Osaka, Japan, under the trade designation "LA4285") with a PMMA UVA master batch (obtained from Sukano Polymers Corporation, Duncan, S.C., under the trade designation "TA11-10 MB03") and fed to the bottom manifold of the multi-manifold die with a 25 mm twin screw extruder at 1.8 kg/hr. (4 lbs./hr.). The fluoropolymer ("3M DYNEON FLUOROPLASTIC GRANULES PVDF 11010/0000") second layer was fed to the center manifold of the multi-manifold die with a 31 mm single screw extruder at 1.8 kg/hr. (4 lbs./hr.). The fluoropolymer ("FLUOROPLASTIC GRANULES THV221GZ") first layer was fed to the top manifold of multi-manifold die with a 31 mm single screw extruder at 1.8 kg/hr. (4 lbs./hr.). The multilayer polymeric film was cast onto a chilled roll at 5.54 meters/minute (18 fpm) to a thickness of 75 micrometers.

The layers of this multilayer polymeric film could not be peeled apart following the Interlayer Adhesion Test method, which indicated the interlayer adhesion was at least 400 grams/cm. After exposure to 30,000 mJ/cm² according to ASTM G-155-05a (October 2005), the multilayer fluoropolymer film was measured to have an absorbance of 2.5 at 340 nm.

Example 3

A multilayer polymeric film was made by coextruding a fluoropolymer (obtained from 3M Dyneon, under the trade designation "FLUOROPLASTIC GRANULES THV610GZ") first layer and fluoropolymer ("3M DYNEON FLUOROPLASTIC GRANULES PVDF 11010/0000") second layer using a 3 layer multi-manifold die. The third layer was created using a 50:50 blend of PMMA butylacrylate copolymer ("LA4285") with PMMA UVA master batch ("TA11-10 MB03") and fed to the bottom manifold of the multi-manifold die with a 25 mm twin screw extruder at 1.8 kg/hr. (4 lbs./hr.). The fluoropolymer ("3M DYNEON FLUOROPLASTIC GRANULES PVDF 11010/0000") second layer was fed to the center manifold of the multi-manifold die with a 31 mm single screw extruder at 1.8 kg/hr. (4 lbs./hr.). The fluoropolymer ("FLUOROPLASTIC GRANULES THV610GZ") top layer was fed to the top manifold of multi-manifold die with a 31 mm single screw extruder at 1.8 kg/hr. (4 lbs./hr.). The multilayer polymeric film was cast onto a chilled roll at 5.54 meters/minute (18 fpm) to a thickness of 75 micrometers. The interlayer adhesion was determined to be 86.5 grams/centimeter measured according to the Interlayer Adhesion Test method. After exposure to 30,000 mJ/cm² according to ASTM G-155-05a (October 2005), the multilayer fluoropolymer film was measured to have an absorbance of 2.5 at 340 nm. The multilayer fluoropolymer film had a CIELAB DE* color change of less than 1.2 as shown in Table 1, below, according to the Graffiti Resistance Test Method. The multilayer fluoropolymer film had a percent gloss retention of greater than 67 according to the Solvent Resistance Test Method as shown in Table 2, below.

TABLE 1

| Example # | Graffiti Type Material | Cleaning Solvent | CIELAB DE* Color Change | % Gloss Retention at 60 degrees |
| --- | --- | --- | --- | --- |
| 3 | Blue Marker | none | 0.38 | 41.9 |
| 3 | Green Paint | none | 0.35 | 52.4 |
| 3 | Red Paint | none | 0.34 | 44.1 |
| 3 | Blue Marker | IPA | 0.63 | 75.7 |
| 3 | Green Paint | IPA | 1.15 | 80.3 |
| 3 | Red Paint | IPA | 0.78 | 74.8 |
| 3 | Blue Marker | MEK | 0.64 | 74.2 |
| 3 | Green Paint | MEK | 0.43 | 66.0 |
| 3 | Red Paint | MEK | 0.51 | 24.2 |
| 4 | Blue Marker | none | 0.47 | 80.1 |
| 4 | Green Paint | none | 0.19 | 78.3 |
| 4 | Red Paint | none | 0.54 | 73.2 |
| 4 | Blue Marker | IPA | 0.27 | 83.5 |
| 4 | Green Paint | IPA | 0.42 | 83.2 |
| 4 | Red Paint | IPA | 0.22 | 59.5 |
| 4 | Blue Marker | MEK | 0.45 | 81.4 |
| 4 | Green Paint | MEK | 0.19 | 84.7 |
| 4 | Red Paint | MEK | 0.10 | 73.4 |

TABLE 2

| Example # | Solvent | % Gloss Retention at 60 degrees |
| --- | --- | --- |
| 3 | IPA | 94.1 |
| 3 | MEK | 89.7 |
| 3 | Acetone | 68.9 |
| 4 | IPA | 99.3 |
| 4 | MEK | 97.2 |
| 4 | Acetone | 98.4 |

Example 4

A multilayer polymeric film was made by coextruding a fluoropolymer first layer (obtained from 3M Dyneon, under the trade designation "FLUOROPLASTIC GRANULES THV815GZ") and a fluoropolymer second layer ("3M DYNEON FLUOROPLASTIC GRANULES PVDF 11010/0000") using a 3 layer multi-manifold die. The third layer was created using a 50:50 blend of PMMA butylacrylate copolymer ("LA4285") with PMMA UVA master batch ("TA11-10 MB03") and fed to the bottom manifold of the multi-manifold die with a 25 mm twin screw extruder at 1.8 kg/hr. (4 lbs./hr.). The fluoropolymer second layer ("3M DYNEON FLUOROPLASTIC GRANULES PVDF 11010/0000") was fed to the center manifold of the multi-manifold die with a 31 mm single screw extruder at 1.8 kg/hr. (4 lbs./hr.). The fluoropolymer ("FLUOROPLASTIC GRANULES THV815GZ") first layer was fed to the top manifold of multi-manifold die with a 31 mm single screw extruder at 1.8 kg/hr. (4 lbs./hr.). The multilayer polymeric film was cast onto a chilled roll at 5.54 meters/minute (18 fpm) to a thickness of 75 micrometers. The interlayer adhesion was determined to be 183.6 grams/centimeter (459 grams/inch) as measured according to the Interlayer Adhesion Test Method. After exposure to 30,000 mJ/cm² according to ASTM G-155-05a (October 2005), the multilayer fluoropolymer film was measured to have an absorbance of 2.5 at 340 nm. The multilayer fluoropolymer film had a CIELAB DE* color change of less than 0.6 as shown in Table 1, above, according to the Graffiti Resistance Test Method. The multilayer fluoropolymer film had a percent gloss retention of greater than 97 according to the Solvent Resistance Test Method as shown in Table 2, above.

Example 5

A multilayer polymeric film was made by coextruding a fluoropolymer first layer ("FLUOROPLASTIC GRANULES THV815GZ") and a fluoropolymer second layer (obtained from 3M Dyneon, under the trade designation "3M DYNEON FLUOROPLASTIC GRANULES PVDF 6008/0001") using a 3 layer multi-manifold die. The third layer was created using a 50:50 blend of PMMA butylacrylate copolymer ("LA4285") with a PMMA UVA master batch ("TA11-10 MB03") and fed to the bottom manifold of the multi-manifold die with a 25 mm twin screw extruder at 1.8 kg/hr (4 lbs./hr.). The fluoropolymer ("3M DYNEON FLUOROPLASTIC GRANULES PVDF 6008/0001") for the second layer was fed to the center manifold of the multi-manifold die with a 31 mm single screw extruder at 1.8 kg/hr. (4 lbs./hr.). The fluoropolymer ("FLUOROPLASTIC GRANULES THV815") first layer was fed to the top manifold of multi-manifold die with a 31 mm single screw extruder at 1.8 kg/hr. (4 lbs./hr.). The multilayer polymeric film was cast onto a chilled roll at 5.54 meters/minute (18 fpm) to a thickness of 75 micrometers. The interlayer adhesion was determined to be 74.4 grams/cm as measured according to the Interlayer Adhesion Test Method. After exposure to 30,000 mJ/cm² according to ASTM G-155-05a (October 2005), the multilayer fluoropolymer film was measured to have an absorbance of 2.5 at 340 nm.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A multilayer fluoropolymer film comprising, in order:
   a first layer having an exposed major surface exposed to air, the first layer comprising a first polymer, the first polymer comprising at least 35 mol percent tetrafluoroethylene comonomer, at least 15 mol percent vinylidene fluoride comonomer, and at least 5 mol percent hexafluoropropylene comonomer, based on the total mol percent of the first polymer;
   a second layer comprising a second polymer, the second polymer comprising at least 50 mol percent vinylidene fluoride comonomer, based on the total mol percent of the second polymer and wherein the second layer has a thickness of at least 1 micrometer; and
   a third layer comprising a third polymer, the third polymer comprising at least 50 mol percent methylmethacrylate comonomer, based on the total mol percent of the third polymer wherein the multilayer polymeric film has an interlayer adhesion of at least 150 grams/cm,
   wherein the multilayer fluoropolymer film does not comprise a repeating second or third layer.

2. The multilayer fluoropolymer film of claim 1, wherein the first polymer further comprises at least 0.5 mol percent perfluorovinylether comonomer, based on the total mol percent of the first polymer.

3. The multilayer fluoropolymer film of claim 1, wherein the second polymer further comprises at least 1 mol percent perfluorovinylether comonomer, based on the total mol percent of the second polymer.

4. The multilayer fluoropolymer film of claim 1, wherein the second polymer further comprises at least 0.5 mol percent hexafluoropropylene comonomer, based on the total mol percent of the second polymer.

5. The multilayer fluoropolymer film of claim 1, wherein at least one of the second or third layers further comprises at least 0.1 wt. % ultraviolet absorber, based on the total weight of the second or third layer, respectively.

6. The multilayer fluoropolymer film of claim 1, wherein at least one of the second or third layers further comprises at least 0.05 wt. % hindered amine light stabilizer, based on the total weight of the second or third layer, respectively.

7. The multilayer fluoropolymer film of claim 1, wherein the third polymer further comprises at least 0.1 mol % butylacrylate comonomer, based on the total mol percent of the third polymer.

8. The multilayer fluoropolymer film of claim 1 further comprising a fourth layer comprising adhesive, wherein the order of the layers are the first layer, the second layer, the third layer, and the fourth layer.

9. The multilayer fluoropolymer film of claim 8, wherein the fourth layer has a thickness of at least 1 micrometer.

10. The multilayer fluoropolymer film of claim 8, wherein an interlayer adhesion between the third layer and fourth layer is at least 40 g/cm, wherein the fourth layer comprises at least one of a polyolefin copolymer, a polycarbonate polymer, or a polyurethane polymer.

11. The multilayer fluoropolymer film of claim 1 having an interlayer adhesion between the first and second layers as determined by the Interlayer Adhesion Test of at least 40 g/cm.

12. The multilayer fluoropolymer film of claim 1 having an interlayer adhesion between the second and third layers as determined by the Interlayer Adhesion Test of at least 40 g/cm.

13. The multilayer fluoropolymer film of claim 1, wherein the exposed major surface of the first layer has a CIELAB DE* color change of less than 1.5 according to the Graffiti Resistance Test Method.

14. The multilayer fluoropolymer film of claim 1 having an ultraviolet Absorbance Value of at least 2 measured at a wavelength of 340 nm after exposure to 30,000 mJ/cm² according to ASTM G-155-05a (October 2005).

15. The multilayer fluoropolymer film of claim 1, wherein the exposed major surface of the first layer has a percent gloss retention of at least 87 according to the Solvent Resistance Test Method.

16. The multilayer fluoropolymer film of claim 1, wherein the multilayer fluoropolymer film is a co-extruded film.

17. The multilayer fluoropolymer film of claim 1, wherein the first layer has a thickness of at least 10 micrometers.

18. The multilayer fluoropolymer film of claim 1, wherein the third layer has a thickness of at least 10 micrometers.

19. The multilayer fluoropolymer film of claim 1, wherein the first layer has first and second opposed major surfaces, wherein the first major surface of the first layer is an anti-reflective surface structure.

20. A roll of the multilayer fluoropolymer film of claim 1.

21. A multilayer optical film comprising, in order:
   the multilayer fluoropolymer film of claim 1; and
   a multilayer optical film having first and second opposed major surfaces,
   wherein the third layer of the multilayer fluoropolymer film is adjacent to the first major surface of the multilayer optical film.

22. A multilayer optical film comprising a first and a second multilayer fluoropolymer film of claim 1, wherein, in order are:
   the first multilayer fluoropolymer film; and
   a multilayer optical film having first and second opposed major surfaces; and
   the second multilayer fluoropolymer film,
   wherein the third layer of the first multilayer fluoropolymer film is adjacent to the first major surface of the multilayer optical film, and wherein the third layer of the second multilayer fluoropolymer film is adjacent to the second major surface of the multilayer optical film.

23. The multilayer fluoropolymer film of claim 1, wherein the third polymer comprises a polymethylmethacrylate-butylacrylate block copolymer.

24. The multilayer fluoropolymer film of claim 1, wherein the multilayer fluoropolymer film is free of a multilayer optical film.

* * * * *